United States Patent
Jaekel et al.

(10) Patent No.: US 7,156,411 B2
(45) Date of Patent: Jan. 2, 2007

(54) HITCH ASSEMBLY

(75) Inventors: Federico G. Jaekel, Aurora (CA); Hans J. Reckler, Bradford (CA)

(73) Assignee: Martinrea International Inc., Ontario (CA)

( * ) Notice: Subject to any disclaimer, the term of this patent is extended or adjusted under 35 U.S.C. 154(b) by 0 days.

(21) Appl. No.: 10/777,208

(22) Filed: Feb. 13, 2004

(65) Prior Publication Data

US 2005/0179232 A1   Aug. 18, 2005

(51) Int. Cl.
   *B60D 1/00* (2006.01)
(52) U.S. Cl. .................. 280/495; 280/479.1; 280/491.1
(58) Field of Classification Search ................ 280/495, 280/500, 478.1, 479.1, 491.1, 491.2, 482
   See application file for complete search history.

(56) References Cited

U.S. PATENT DOCUMENTS

| | | | |
|---|---|---|---|
| 2,612,384 A | 9/1952 | Wiegman | |
| 2,693,368 A | 11/1954 | Petron | |
| 2,894,766 A | 7/1959 | Habriga | |
| 3,446,518 A | 5/1969 | Dodgson et al. | |
| 4,169,611 A | 10/1979 | Smith et al. | |
| 4,482,167 A | 11/1984 | Haugrud | |
| 4,570,966 A | 2/1986 | Giboney et al. | |
| 5,011,177 A * | 4/1991 | Grice | ........................... 280/482 |
| D341,117 S | 11/1993 | Sundstedt | |
| 5,333,888 A | 8/1994 | Ball | |
| 5,423,566 A | 6/1995 | Warrington et al. | |
| 5,507,515 A | 4/1996 | Schellenberg et al. | |
| 5,511,813 A | 4/1996 | Kravitz | |
| D372,001 S | 7/1996 | Alford | |
| D373,557 S | 9/1996 | Shaw et al. | |
| D379,343 S | 5/1997 | Shaw et al. | |
| 5,853,187 A | 12/1998 | Maier | |
| 6,139,042 A | 10/2000 | Tetrick | |
| 6,173,984 B1 | 1/2001 | Kay | |
| 6,189,910 B1 | 2/2001 | Bartel | |
| 6,203,048 B1 | 3/2001 | Adair | |
| 6,234,512 B1 * | 5/2001 | Bettenhausen | ........... 280/491.1 |
| 6,402,178 B1 | 6/2002 | Ifflaender | |
| 6,460,870 B1 | 10/2002 | Moss | |
| 6,464,240 B1 | 10/2002 | Seksaria et al. | |
| 6,502,845 B1 | 1/2003 | Van Vleet | |
| 6,511,090 B1 | 1/2003 | Quanbeck et al. | |
| D470,085 S | 2/2003 | Newport | |
| D470,444 S | 2/2003 | Newport | |
| 6,527,292 B1 | 3/2003 | Adair | |
| 6,540,277 B1 * | 4/2003 | McCoy et al. | ............... 293/117 |
| 6,581,955 B1 | 6/2003 | Aquinto et al. | |

(Continued)

FOREIGN PATENT DOCUMENTS

| DE | 37 38724 A1 | 6/1989 |
|---|---|---|
| GB | 2 207 103 A | 1/1989 |

*Primary Examiner*—Tony Winner
(74) *Attorney, Agent, or Firm*—Pillsbury Winthrop Shaw Pittman LLP

(57) ABSTRACT

A hitch assembly for mounting to a frame assembly of a vehicle comprises a one-piece hitch mounting structure having a general U-shape with opposing end portions and a centrally disposed intermediate portion between the end portions. A hitch receiver is mounted to the intermediate portion of the hitch mounting structure. The end portions each include a mounting section with a general L-shaped cross-sectional configuration, thereby providing the end portions with horizontally extending mounting flanges structured to mount the hitch assembly to the frame assembly of the vehicle.

28 Claims, 24 Drawing Sheets

U.S. PATENT DOCUMENTS

| | | |
|---|---|---|
| 6,729,639 B1 * | 5/2004 | Tomita ........................ 280/495 |
| 6,871,868 B1 * | 3/2005 | Pogue ..................... 280/479.1 |
| 2002/0041078 A1 * | 4/2002 | Aquinto et al. ............. 280/500 |
| 2002/0113406 A1 | 8/2002 | Quanbeck et al. |
| 2002/0171225 A1 | 11/2002 | Adair |
| 2002/0190500 A1 | 12/2002 | McCoy et al. |
| 2003/0038453 A1 | 2/2003 | Seksaria et al. |
| 2003/0090085 A1 | 5/2003 | Seksaria et al. |
| 2004/0021295 A1 * | 2/2004 | Westerdale .................. 280/495 |
| 2004/0061310 A1 * | 4/2004 | McCoy et al. .............. 280/495 |

* cited by examiner

HITCH ASSEMBLY

BACKGROUND OF THE INVENTION

1. Field of the Invention

The present invention relates to hitch assemblies.

2. Description of Related Art

Known hitch assemblies include a mounting assembly with a hitch receiver and a safety chain tube secured thereto, e.g., by welding. Typically, the mounting assembly is formed by welding two channel-shaped members together to form a tube; then, the tube is bent into a U-shape. Mounting brackets are formed and welded to ends of the tube for attaching the mounting assembly to a vehicle frame. Thus, known hitch assemblies are manufactured from several parts with an elaborate process including stamping, forming, and welding.

The present invention provides improvements over known hitch assemblies to simply the manufacturing process, reduce the number of parts, and improve safety.

Also, it is known to provide hitch assemblies with retractable hitches that can be manually and automatically moved between an extended position and a retracted position.

The present invention provides improvements over known retractable hitch assemblies to facilitate use and operation.

SUMMARY OF THE INVENTION

One aspect of the invention relates to a hitch assembly having an improved hitch mounting structure for mounting the hitch assembly to a vehicle frame. This aspect of the invention provides a hitch assembly for mounting to a frame assembly of a vehicle. The hitch assembly comprises a one-piece hitch mounting structure having a general U-shape with opposing end portions and a centrally disposed intermediate portion between the end portions. A hitch receiver is mounted to the intermediate portion of the hitch mounting structure. The end portions each include a mounting section with a general L-shaped cross-sectional configuration, thereby providing the end portions with horizontally extending mounting flanges structured to mount the hitch assembly to the frame assembly of the vehicle.

Another aspect of the invention provides a hitch assembly for mounting to a frame assembly of a vehicle. The hitch assembly comprises a one-piece hitch mounting structure having a general U-shape with opposing end portions and a centrally disposed intermediate portion between the end portions. A hitch receiver is mounted to the intermediate portion of the hitch mounting structure. The end portions each include a mounting section with a general U-shaped cross-sectional configuration, thereby providing the end portions with vertically extending mounting flanges structured to mount the hitch assembly to the frame assembly of the vehicle.

Another aspect of the invention provides a method of forming a hitch assembly for mounting to a frame assembly of a vehicle. The method comprises bending an elongated substantially tubular body member in a die assembly to form a one-piece hitch mounting structure having a general U-shape with opposing end portions and a centrally disposed intermediate portion between the end portions; bending the end portions in the die assembly to form a mounting section with a general L-shaped cross-sectional configuration, thereby providing the end portions with horizontally extending mounting flanges structured to mount the hitch assembly to the frame assembly of the vehicle; and mounting a hitch receiver to the intermediate portion of the hitch mounting structure.

Another aspect of the invention provides a method of forming a hitch assembly for mounting to a frame assembly of a vehicle. The method comprises bending an elongated substantially tubular body member in a die assembly to form a one-piece hitch mounting structure having a general U-shape with opposing end portions and a centrally disposed intermediate portion between the end portions; bending the end portions in the die assembly to form a mounting section with a general U-shaped cross-sectional configuration, thereby providing the end portions with vertically extending mounting flanges structured to mount the hitch assembly to the frame assembly of the vehicle; and mounting a hitch receiver to the intermediate portion of the hitch mounting structure.

Another aspect of the invention relates to a retractable hitch assembly that can be electrically actuated to move between an extended position and a retracted position. This aspect of the invention provides a retractable hitch assembly for mounting to a frame assembly of a vehicle. The retractable hitch assembly comprises a hitch mounting structure with end portions and a centrally disposed intermediate portion between the end portions. The end portions are structured to mount the retractable hitch assembly to the frame assembly of the vehicle. A retractable hitch mechanism is securely mounted to the hitch mounting structure. The retractable hitch mechanism includes an outer hitch receiver mounted to the intermediate portion of the hitch mounting structure. An inner hitch receiver is telescopically mounted within the outer hitch receiver for sliding movement with respect to the outer hitch receiver between an extended position and a retracted position. The retractable hitch mechanism includes a reversible electric motor. A gear arrangement is operatively mounted between the reversible electric motor and the inner hitch receiver. The reversible electric motor is electrically actuated to selectively drive the inner hitch receiver with respect to the outer hitch receiver via the gear arrangement between the extended and retracted positions thereof.

Other aspects, features, and advantages of this invention will become apparent from the following detailed description when taken in conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

FIGS. 1–9 illustrate a hitch assembly 10 constructed according to an embodiment of the present invention. As is conventional, the hitch assembly 10 is typically mounted to a rearward end of a vehicle for use in pulling trailers, for example. However, the hitch assembly 10 may be disposed along a forward end of the vehicle. The hitch assembly 10 may be utilized on any suitable vehicle, such as trucks, sport utility vehicles, and construction equipment, for example.

Figure 1:
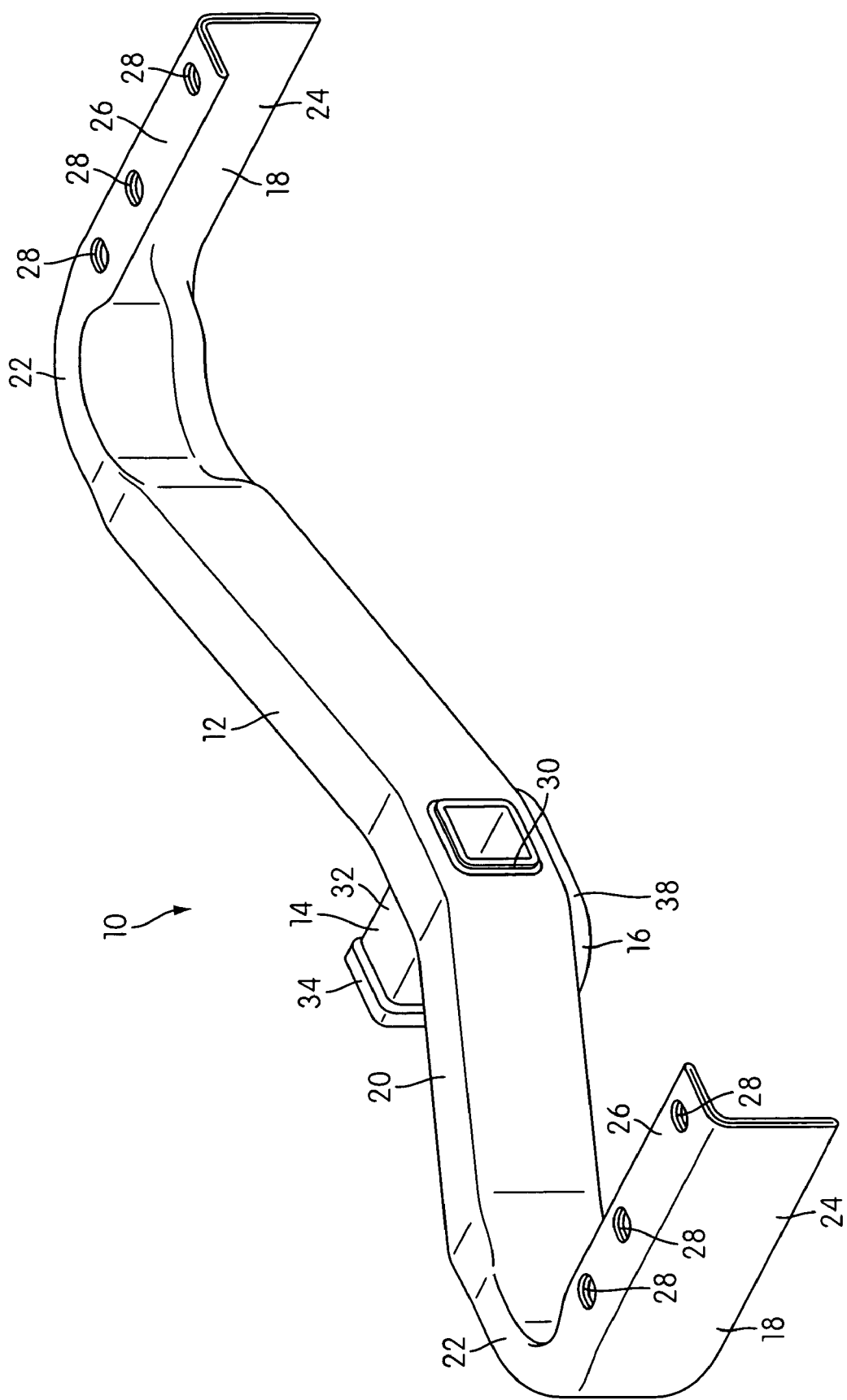
FIG. 1 is a rear perspective view illustrating a hitch assembly constructed in accordance with an embodiment of the invention.
Figure 2:
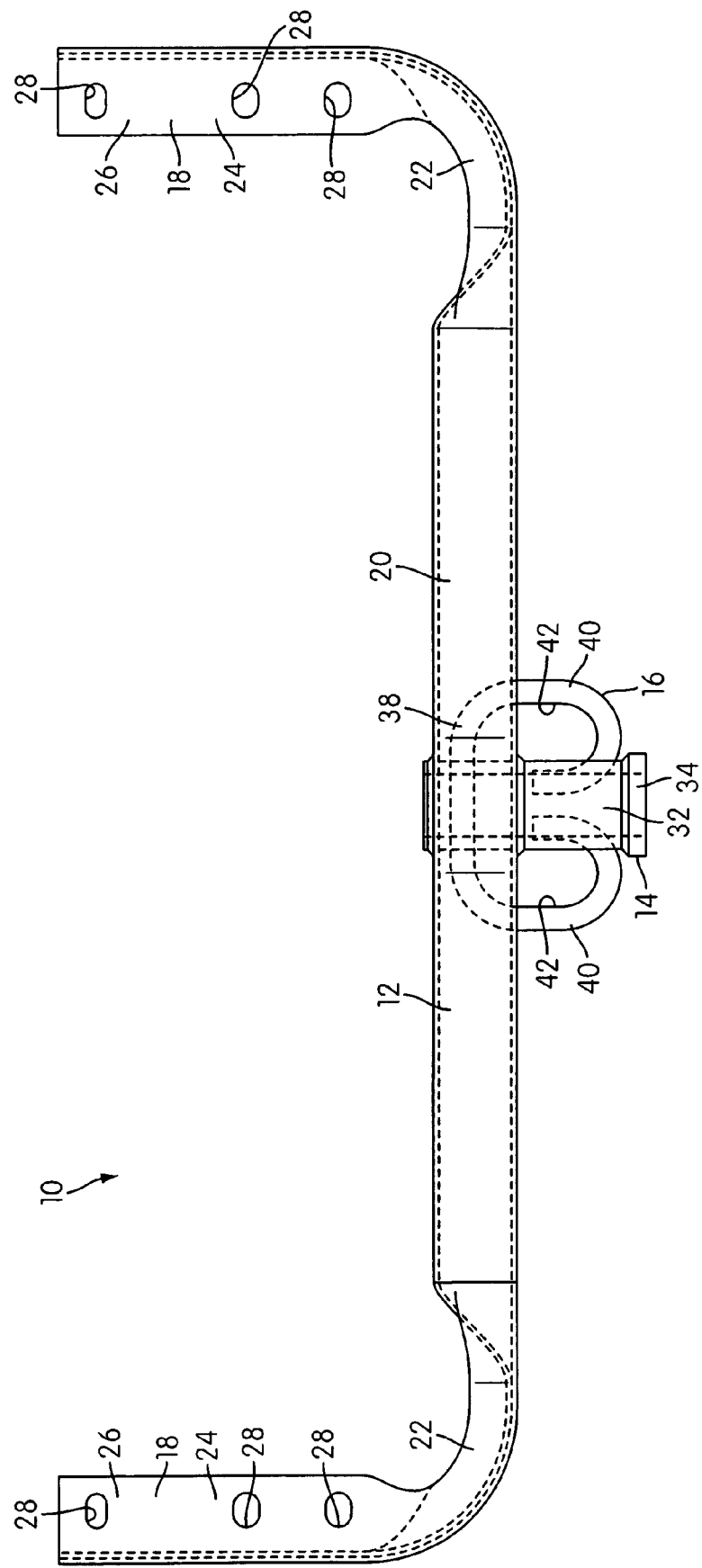
FIG. 2 is a top view of the hitch assembly shown in FIG. 1.
Figure 3:
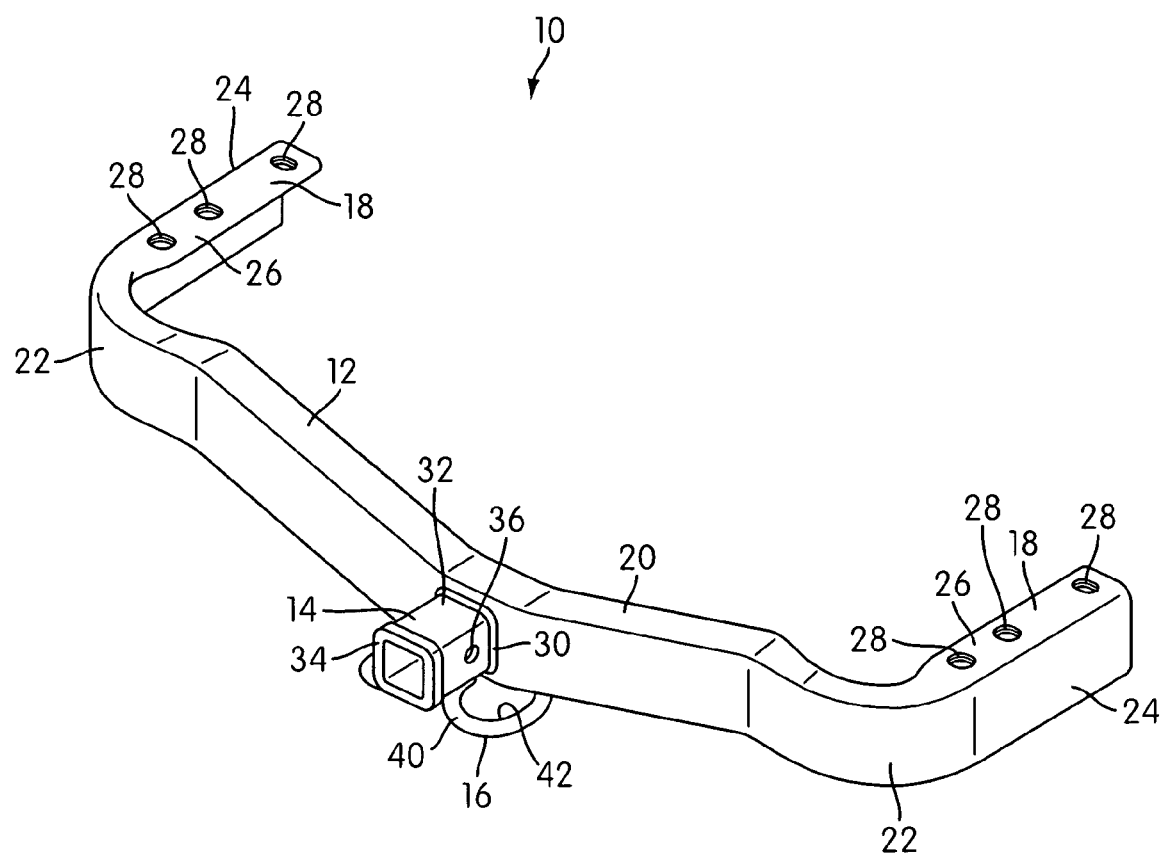
FIG. 3 is a front perspective view of the hitch assembly shown in FIG. 1.
Figure 4:
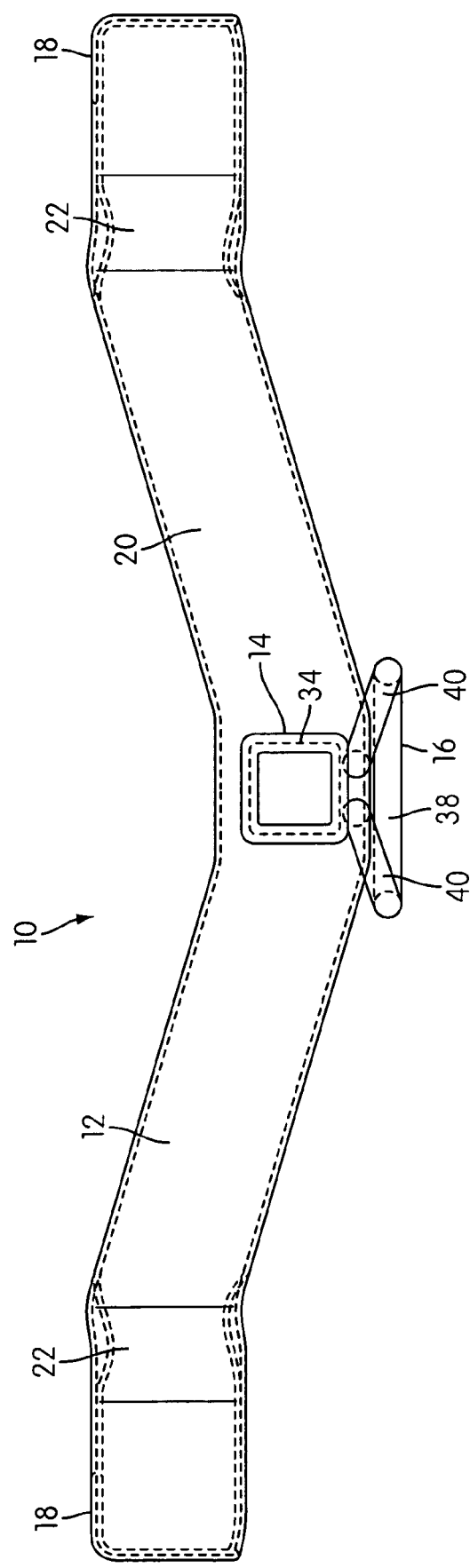
FIG. 4 is a front view of the hitch assembly show in FIG. 1.
Figure 5:
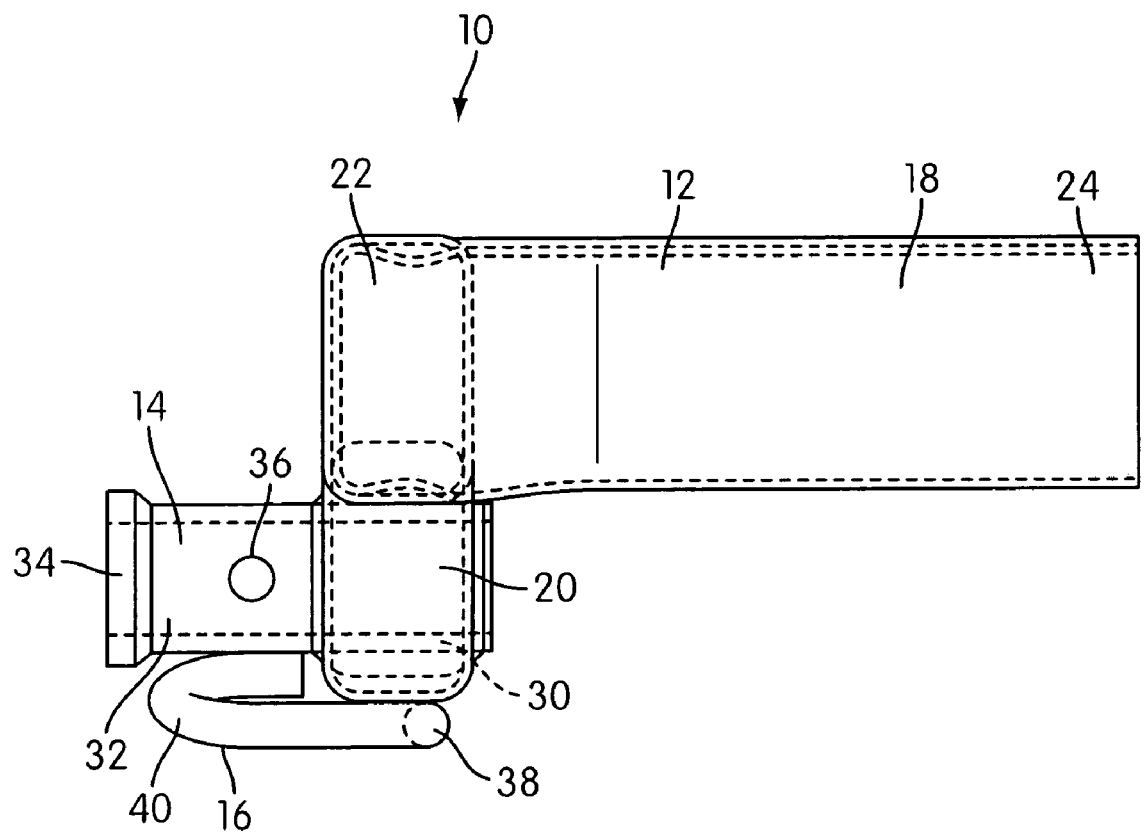
FIG. 5 is a side view of the hitch assembly shown in FIG. 1.
Figure 6:
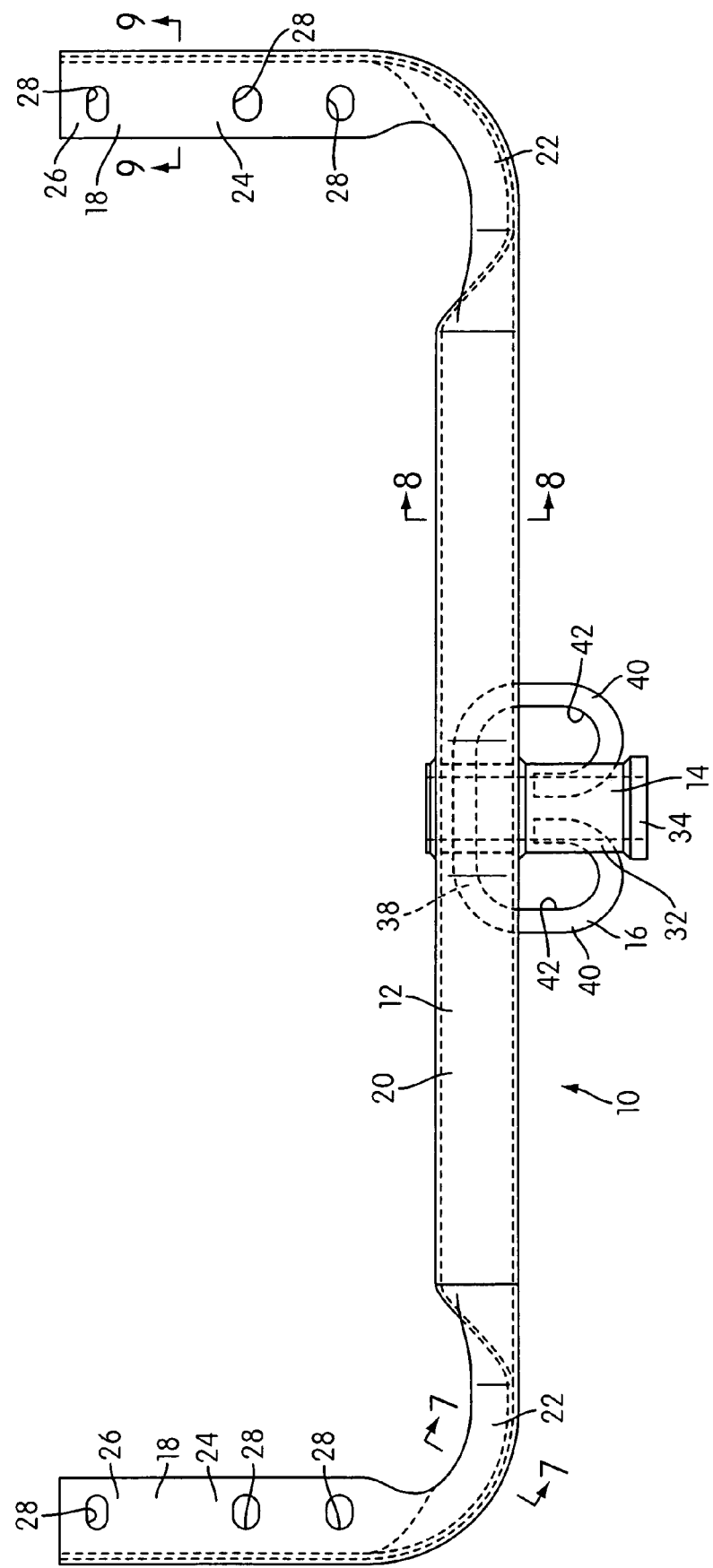
FIG. 6 is a top view of the hitch assembly shown in FIG. 1.
Figure 7:
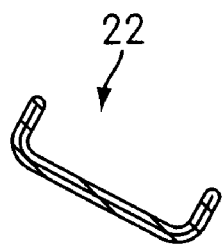
FIG. 7 is a cross-sectional view through line 7—7 of FIG. 6.
Figure 8:
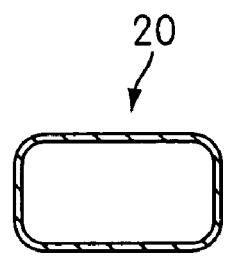
FIG. 8 is a cross-sectional view through line 8—8 of FIG. 6.

As best shown in FIGS. 1 and 3, the hitch assembly 10 includes three main components that are securely mounted to one another. Specifically, the hitch assembly 10 includes a hitch mounting structure 12, a hitch receiver 14, and a safety chain mounting structure 16.

As shown in FIG. 1, the hitch mounting structure 12 is formed from an elongated substantially tubular body member having a generally rectangular cross-section. However, the hitch mounting structure 12 may be formed from a tubular body member having other suitable cross-sectional configurations, e.g., circular, square, etc. The elongated body member is bent in a die assembly into a general U-shape (when viewed from above as in FIG. 2) to provide a one-piece hitch mounting structure 12 with opposing end portions 18 and a centrally disposed intermediate portion 20 extending between the end portions 18.

In the illustrated embodiment, the elongated tubular body member is bent such that the end portions 18 have similar cross-sectional configurations. However, the end portions 18 may have different configurations from one another. Also, the tubular body member is bent such that cross-sectional configurations of the end portions 18 are different than the cross-sectional configuration of the intermediate portion 20.

Figure 9:
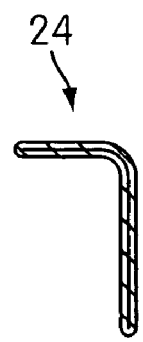
FIG. 9 is a cross-sectional view through line 9—9 of FIG. 6.
Figure 10:
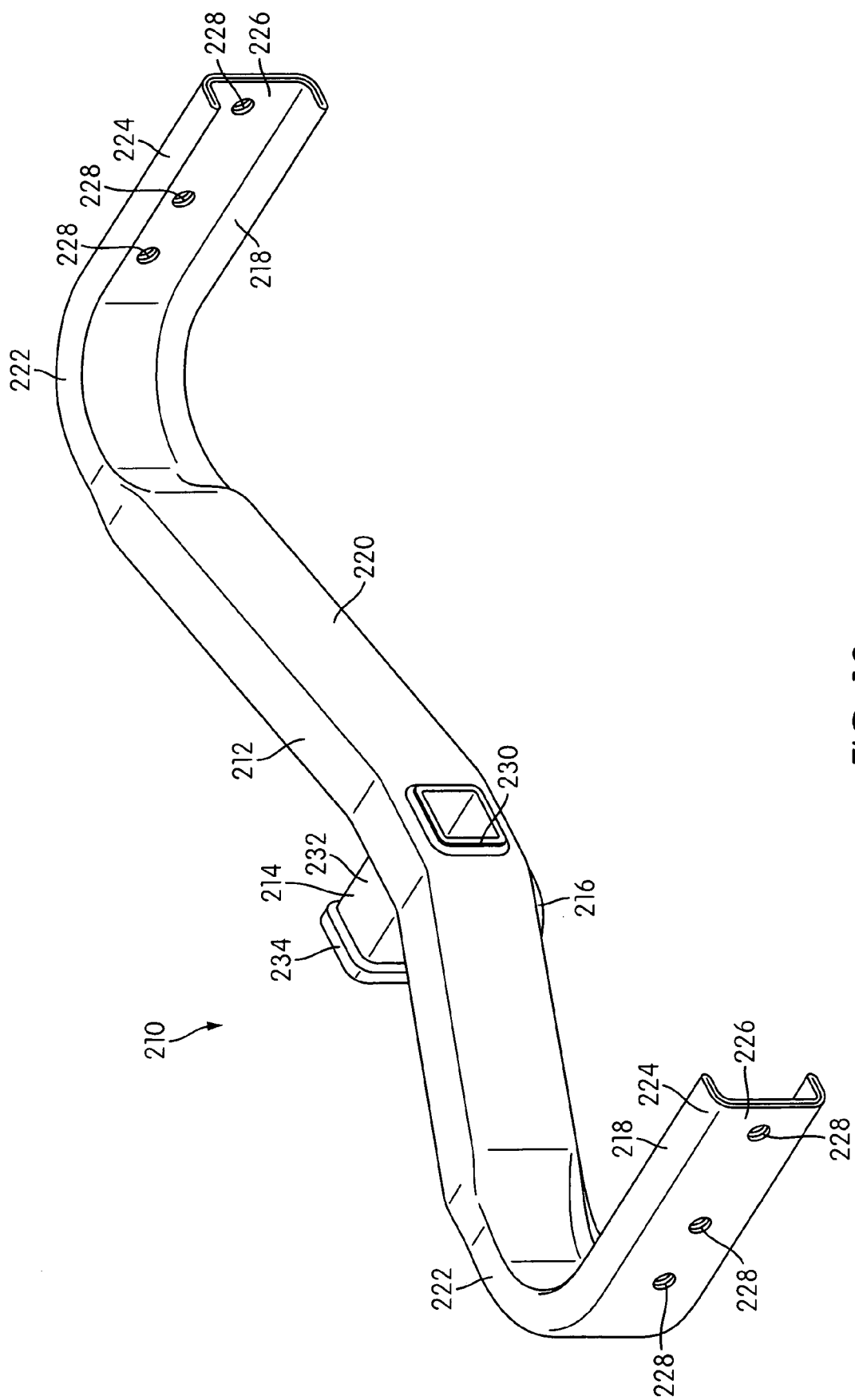
FIG. 10 is a rear perspective view illustrating another embodiment of a hitch assembly.
Figure 11:
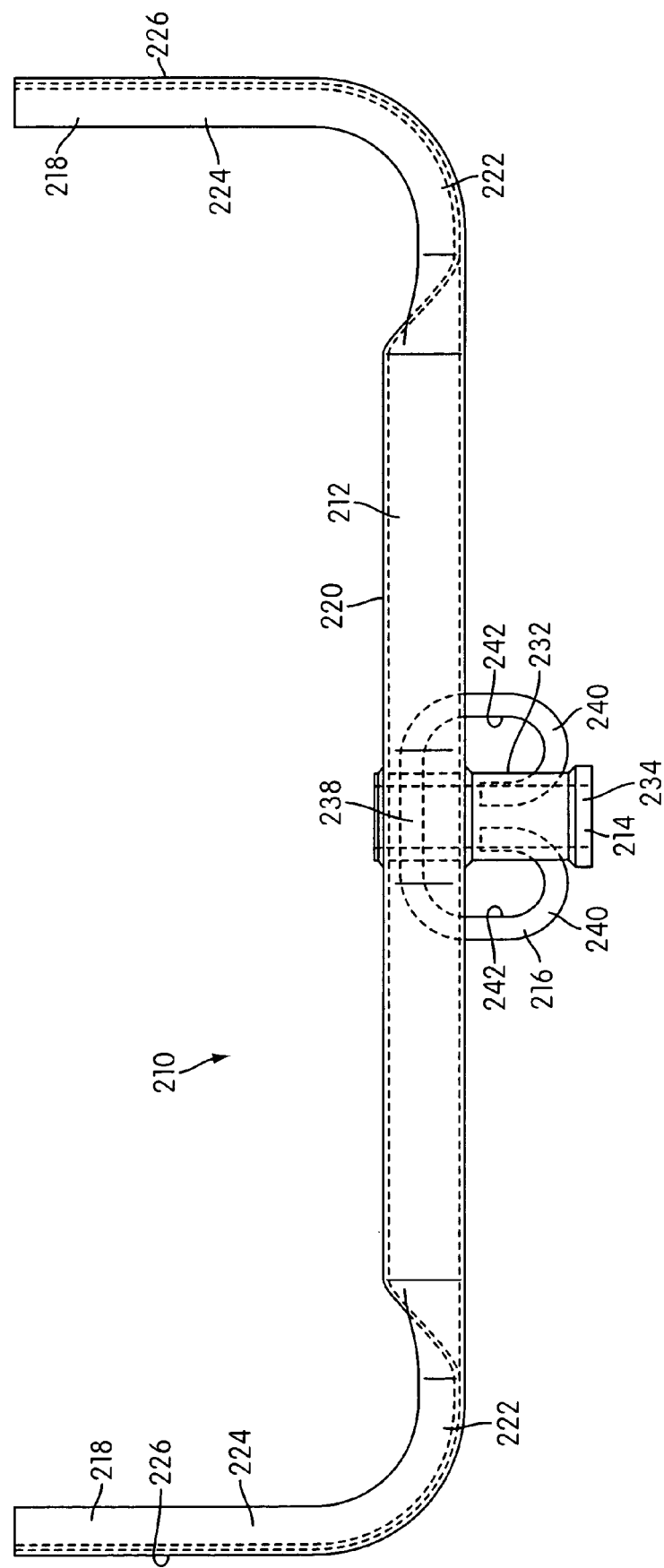
FIG. 11 is a top view of the hitch assembly shown in FIG. 10.
Figure 12:
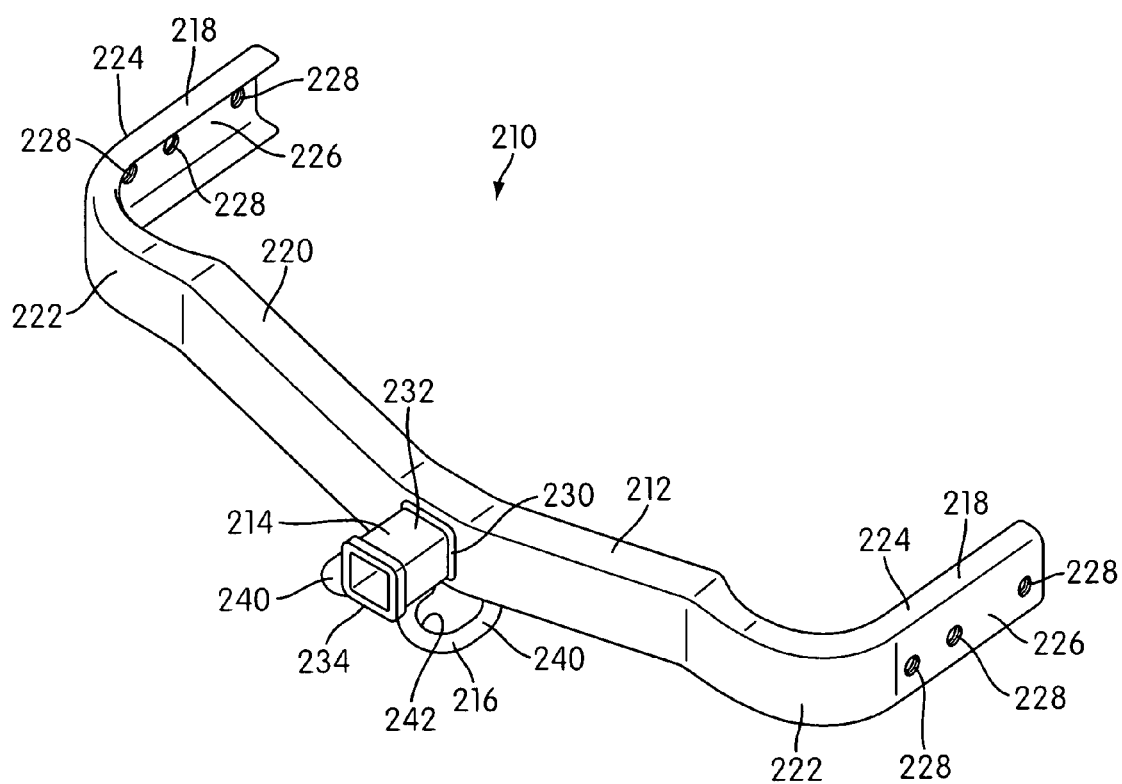
FIG. 12 is a front perspective view of the hitch assembly shown in FIG. 10.
Figure 13:
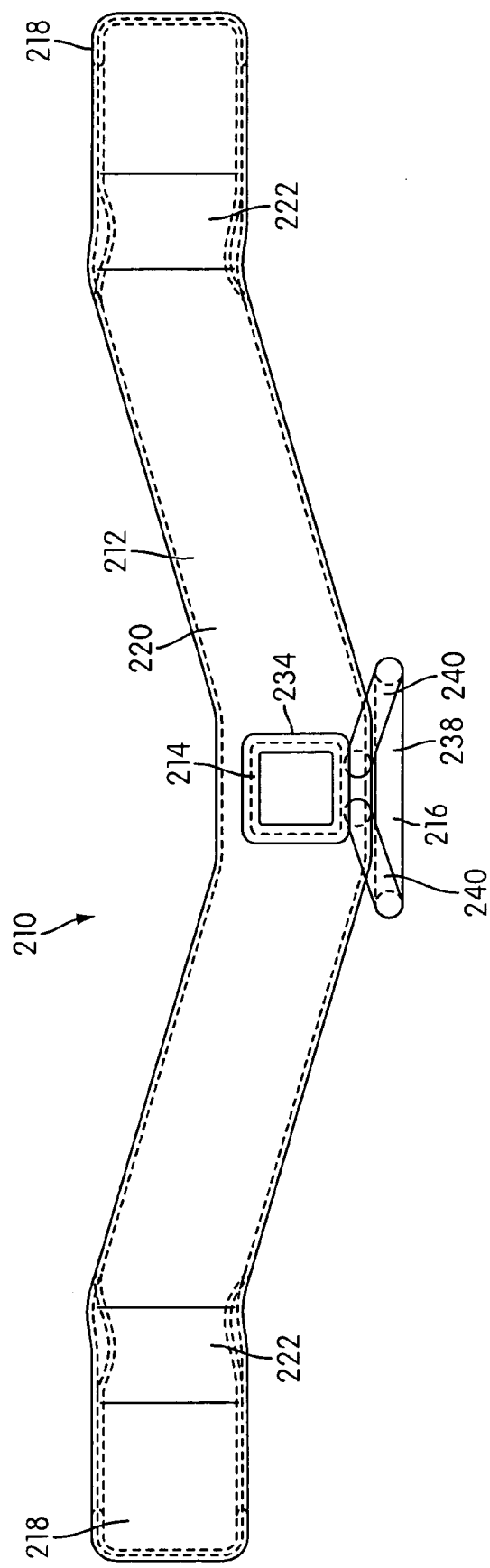
FIG. 13 is a front view of the hitch assembly shown in FIG. 10.
Figure 14:
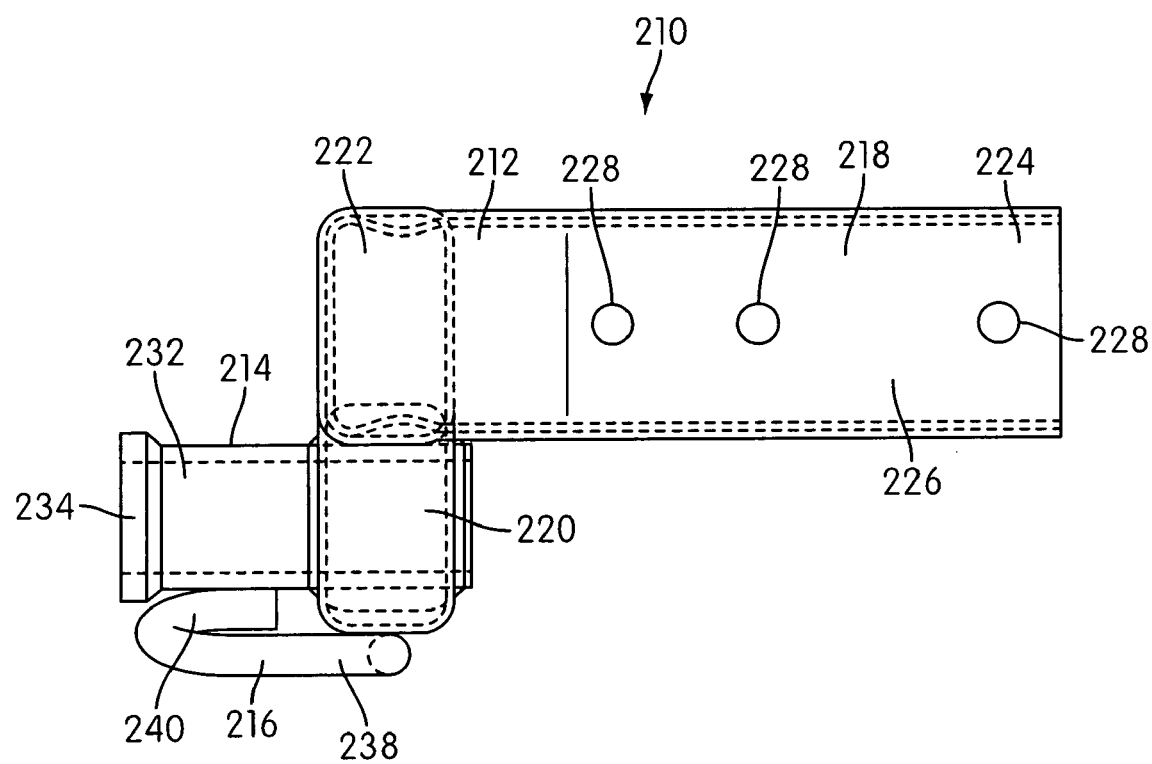
FIG. 14 is a side view of the hitch assembly shown in FIG. 10.
Figure 15:
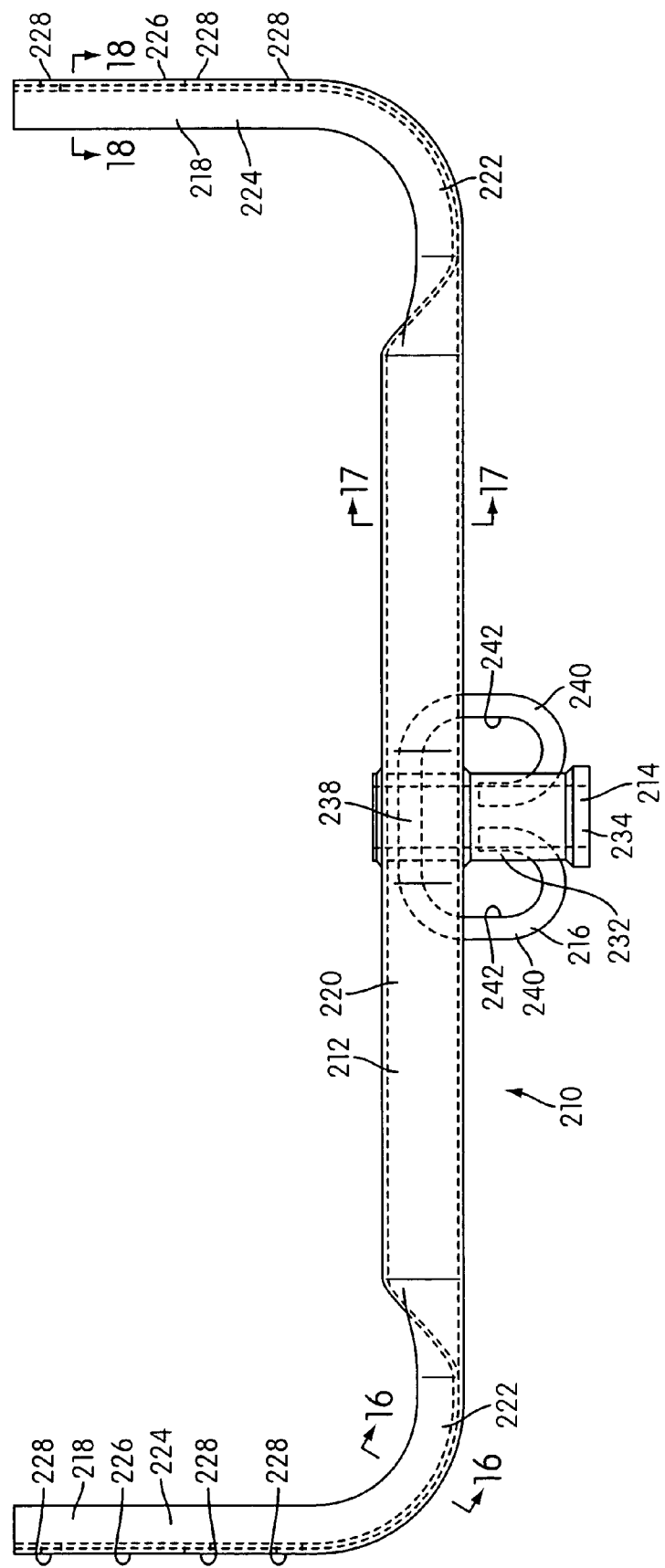
FIG. 15 is a top view of the hitch assembly shown in FIG. 10.
Figure 16:
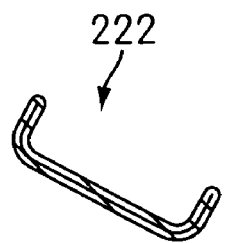
FIG. 16 is a cross-sectional view through line 16—16 of FIG. 15.
Figure 17:
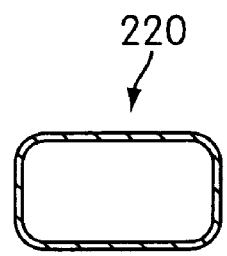
FIG. 17 is a cross-sectional view through line 17—17 of FIG. 15.

Specifically, as shown in FIGS. 6–9, the intermediate portion 20 of the hitch mounting structure 12 has a generally rectangular cross-sectional configuration (see FIG. 8), while the end portions 18 each have an elbow section 22 with a general U-shaped cross-sectional configuration (see FIG. 7) and a mounting section 24 with a general L-shaped cross-sectional configuration (see FIG. 9). Specifically, the tubular body member is bent or pinched by the die assembly such that walls of tubular body member are moved adjacent to one another to form the general U-shaped elbow section 22 and the general L-shaped mounting section 24 of the end portions 18. The mounting sections 24 of the end portions 18 are configured to be operatively connected to the frame assembly of a vehicle for mounting the hitch assembly 10 to the vehicle. The intermediate portion 20 is configured to be operatively connected to the hitch receiver 14 and the safety chain mounting structure 16.

The generally L-shaped cross-sectional configuration of the mounting sections 24 provides a generally horizontally extending mounting flange 26. A plurality of openings 28, e.g., three openings, are provided in each of the horizontally extending mounting flanges 26 for mounting the hitch assembly 10 to the frame assembly of a vehicle. For example, fasteners, such as bolts, may extend through respective openings 28 in the mounting flanges 26 and into corresponding openings provided in the frame assembly of the vehicle to fixedly attach the hitch assembly 10 to the vehicle. However, the mounting flanges 26 of the hitch assembly 10 may be secured to the frame assembly of the vehicle in any other suitable manner, e.g., by welding.

The generally U-shaped cross-sectional configuration of the elbow sections 22 adds strength and rigidity to the elbow sections 22, thereby preventing deformation of the end portions 18 with respect to the intermediate portion 20 in use. Also, the generally L-shaped configuration of the mounting sections 24 adds strength and rigidity to the mounting sections 24, thereby preventing deformation of the mounting sections 24 with respect to the vehicle frame assembly and/or failure of the mounting sections 24, e.g., mounting sections 24 ripping free from the vehicle frame assembly.

The intermediate portion 20 includes an opening 30 therethrough for receiving the hitch receiver 14. Also, the intermediate portion 20 is bent by the die assembly into a general V-shape (when viewed from the front as in FIG. 4) such that end portions 18 are positioned higher than the opening 30 in the intermediate portion 20. In use, this configuration positions the hitch receiver 14 mounted to the intermediate portion 20 below the end portions 18 that are mounted to the vehicle frame assembly, thereby positioning the hitch receiver 14 away from the vehicle frame assembly for easier access (see FIG. 5).

The hitch receiver 14 includes a generally square-shaped body portion 32 with a receiver ring 34 provided on one end thereof. The receiver ring 34 may be formed in one piece with the body portion 32 or may be formed separately and attached thereto. The receiver ring 34 is provided on the hitch receiver 14 to facilitate engagement of a hitch with the hitch receiver 14. The end of the hitch receiver 14, opposite to the receiver ring 34, is received within the opening 30 provided in the intermediate portion 20 of the hitch mounting structure 12. The hitch receiver 14 is secured within the opening 30 by welding, for example.

In use, a hitch (not shown) is slidably received within the hitch receiver 14 and secured thereto with a locking pin (not shown). Specifically, the hitch receiver 14 includes aligned openings 36 in opposing side walls (see FIGS. 3 and 5) that are aligned with opposing openings provided on the hitch to allow a locking pin, e.g., cotter pin, to extend through the aligned openings to secure the hitch to the hitch receiver 14. The hitch may have any suitable structure, such as a ball mount or a pin mount. Also, the hitch may be secured to the hitch receiver 14 in any other suitable manner.

As best shown in FIGS. 2–5, the safety chain mounting structure 16 is formed of a round rod that is bent to provide the safety chain mounting structure 16 with a mounting section 38 and a pair of arcuate end sections 40. The arcuate end sections 40 extend slightly upwardly from the mounting section 38 (see FIG. 4). The safety chain mounting structure 16 may be bent into the desired shape in any suitable manner, e.g., by a die assembly. As illustrated, the mounting section 38 is mounted, e.g., by welding, to a lower surface of the intermediate portion 20 of the hitch mounting structure 12 and the arcuate sections 40 are mounted, e.g., by welding, to a lower surface of the hitch receiver 14 so as to provide two openings 42. In use, safety chains of a trailer may be connected to the safety chain mounting structure 16 through engagement within the openings 42. A safety chain mounting structure 16 will be provided on all trailer hitches.

In an embodiment, the method of forming the hitch assembly 10 includes forming the hitch mounting structure 12 in a die assembly, e.g., bending die, and then welding the hitch receiver 14 and the safety chain mounting structure 16 to the hitch mounting structure 12. The die assembly is provided in a press that exerts a suitable magnitude of force, e.g., 2000 lbs., for bending the elongated tubular body member into the desired shape of the hitch mounting structure 12. In one embodiment, the die assembly first forms the intermediate portion 20 of the hitch mounting structure 12 and then forms the end portions 18. Alternatively, the portions 18, 20 may be formed simultaneously or in any other suitable order. Also, the elongated tubular body member may be hydroformed prior to bending it in the die assembly to enlarge the diameter of the tubular body member. However, the elongated tubular body member may be bent into the desired form of the hitch mounting structure 12 in any other suitable manner, e.g., hydroforming.

In an embodiment, the plurality of openings 28 in the end portions 18 of the hitch mounting structure 12 are pierced in a piercing operation that is an integral part of the die assembly. However, the plurality of openings 28 may be formed in a piercing operation that is separate from the die assembly, e.g., mechanically or laser cut.

In an embodiment, the opening 30 in the intermediate portion 20 of the hitch mounting structure 12 is cut by a laser in a separate operation from the die assembly. However, the opening 30 may be formed in any other suitable manner, e.g., mechanically cut or formed in an operation that is part of the die assembly.

FIGS. 10–18 illustrate another embodiment of a hitch assembly, indicated as 210. The structure of the hitch assembly 210 is substantially similar to the hitch assembly 10 described above. In contrast, the mounting section 224 of the end portions 218 of the hitch mounting structure 212 have a general U-shaped cross-sectional configuration that provides a vertically extending mounting flange 226 for mounting the hitch assembly 210 to the frame assembly of a vehicle, as will be further discussed.

Specifically, the hitch assembly 210 includes a hitch mounting structure 212, a hitch receiver 214, and a safety chain mounting structure 216. Similar to the hitch assembly 10 described above, the hitch mounting structure 212 is formed from an elongated substantially tubular body member having a generally rectangular cross-section. The elongated body member is bent in a die assembly into a general U-shape (when viewed from above as in FIG. 11) to provide a one-piece hitch mounting structure 212 with opposing end portions 218 and a centrally disposed intermediate portion 220 extending between the end portions 218.

Figure 18:
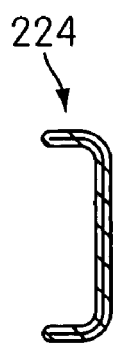
FIG. 18 is a cross-sectional view through line 18—18 of FIG. 15.

As shown in FIGS. 15–18, the intermediate portion 220 of the hitch mounting structure 212 has a generally rectangular cross-sectional configuration (see FIG. 17), while the end portions 218 each have an elbow section 222 with a general U-shaped cross-sectional configuration (see FIG. 16) and a mounting section 224 with a general U-shaped cross-sectional configuration (see FIG. 18). Specifically, the tubular body member is bent or pinched by the die assembly such that walls of tubular body member are moved adjacent to one another to form the general U-shaped elbow section 222 and the general U-shaped mounting section 224 of the end portions 218. The mounting sections 224 of the end portions 218 are configured to be operatively connected to the frame assembly of a vehicle for mounting the hitch assembly 210 to the vehicle. The intermediate portion 220 is configured to be operatively connected to the hitch receiver 214 and the safety chain mounting structure 216.

The generally U-shaped cross-sectional configuration of the mounting sections 224 provides a generally vertically extending mounting flange 226. A plurality of openings 228, e.g., three openings, are provided in each of the vertically extending mounting flanges 226 for mounting the hitch assembly 210 to the frame assembly of a vehicle. For example, fasteners, such as bolts, may extend through respective openings 228 in the mounting flanges 226 and into corresponding openings provided in the frame assembly of the vehicle to fixedly attach the hitch assembly 210 to the vehicle. However, the mounting flanges 226 of the hitch assembly 210 may be secured to the frame assembly of the vehicle in any other suitable manner, e.g., by welding.

The generally U-shaped cross-sectional configuration of the elbow sections 222 adds strength and rigidity to the elbow sections 222, thereby preventing deformation of the end portions 218 with respect to the intermediate portion 220 in use. Also, the generally U-shaped configuration of the mounting sections 224 adds rigidity to the mounting sections 224, thereby preventing deformation of the mounting sections 224 with respect to the vehicle frame assembly and/or failure of the mounting sections 224, e.g., mounting sections 224 ripping free from the vehicle frame assembly.

The intermediate portion 220 includes an opening 230 therethrough for receiving the hitch receiver 214. Also, the intermediate portion 220 is bent by the die assembly into a general V-shape (when viewed from the front as in FIG. 13) such that end portions 218 are positioned higher than the opening 230 in the intermediate portion 220 (see FIG. 14).

The hitch receiver 214 includes a generally square-shaped body portion 232 with a receiver ring 234 provided on one end thereof. The end of the hitch receiver 214, opposite to the receiver ring 234, is received within the opening 230 provided in the intermediate portion 220 of the hitch mounting structure 212. The hitch receiver 214 is secured within the opening 230 by welding, for example.

In use, a hitch (not shown) is slidably received within the hitch receiver 214 and secured thereto with a locking pin (not shown). Specifically, the hitch receiver 214 includes aligned openings (not shown) in opposing side walls that are aligned with opposing openings provided on the hitch to allow a locking pin, e.g., cotter pin, to extend through the aligned openings to secure the hitch to the hitch receiver 214. The hitch may have any suitable structure, such as a ball mount or a pin mount. Also, the hitch may be secured to the hitch receiver 214 in any other suitable manner.

As best shown in FIGS. 2–5, the safety chain mounting structure 216 is formed of a round rod that is bent to provide the safety chain mounting structure 216 with a mounting section 238 and a pair of arcuate end sections 240. The arcuate end sections 240 extend slightly upwardly from the mounting section 238 (see FIG. 13). The safety chain mounting structure 216 may be bent into the desired shape in any suitable manner, e.g., by a die assembly. As illustrated, the mounting section 238 is mounted, e.g., by welding, to a lower surface of the intermediate portion 220 of the hitch mounting structure 212 and the arcuate sections 240 are mounted, e.g., by welding, to a lower surface of the hitch receiver 214 so as to provide two openings 242. In use, safety chains of a trailer may be connected to the safety chain mounting structure 216 through engagement within the openings 242. However, a safety chain mounting structure may not be provided on the hitch assembly 210.

The hitch assemblies 10, 210 provide a simplified product that enables a simplified manufacturing process with respect to known hitch assemblies. Specifically, by forming the hitch mounting structure 12, 212 of the hitch assembly 10, 210 with one piece in a die assembly, many parts can be eliminated. Also, by eliminating the number of welds required to form the hitch assembly 10, 210, the hitch assembly 10, 210 is safer and more reinforced.

FIGS. 19–30 illustrate a retractable hitch assembly 310 constructed according to an embodiment of the present invention. The structure of the retractable hitch assembly 310 is similar to the hitch assembly 10 described above. That is, the hitch mounting structure 312 of the retractable hitch assembly 310 is similar to the hitch mounting structure 12 of the hitch assembly 10. In contrast, the retractable hitch assembly 310 has been modified to include a retractable hitch mechanism 344 for moving a hitch between an extended position and a storage or retracted position, as will be further discussed.

The retractable hitch assembly 310 includes a hitch mounting structure 312 and a retractable hitch mechanism 344 securely mounted thereto. In the illustrated embodiment, the hitch mounting structure 312 has the same structure and method of manufacture as the hitch mounting structure 12 of hitch assembly 10 described above.

Figure 19:
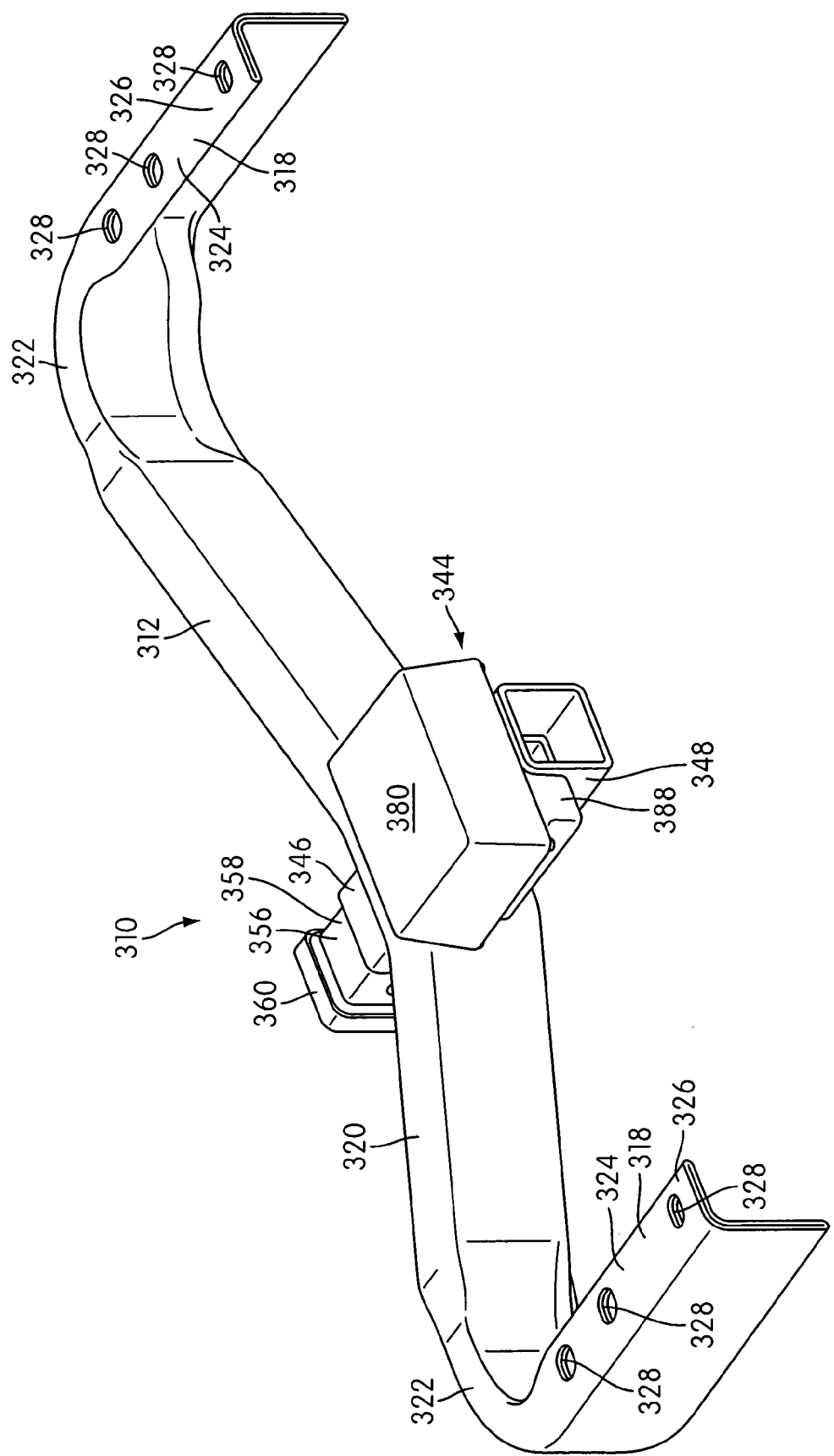
FIG. 19 is a rear perspective view illustrating a retractable hitch assembly constructed in accordance with an embodiment of the invention.
Figure 20:
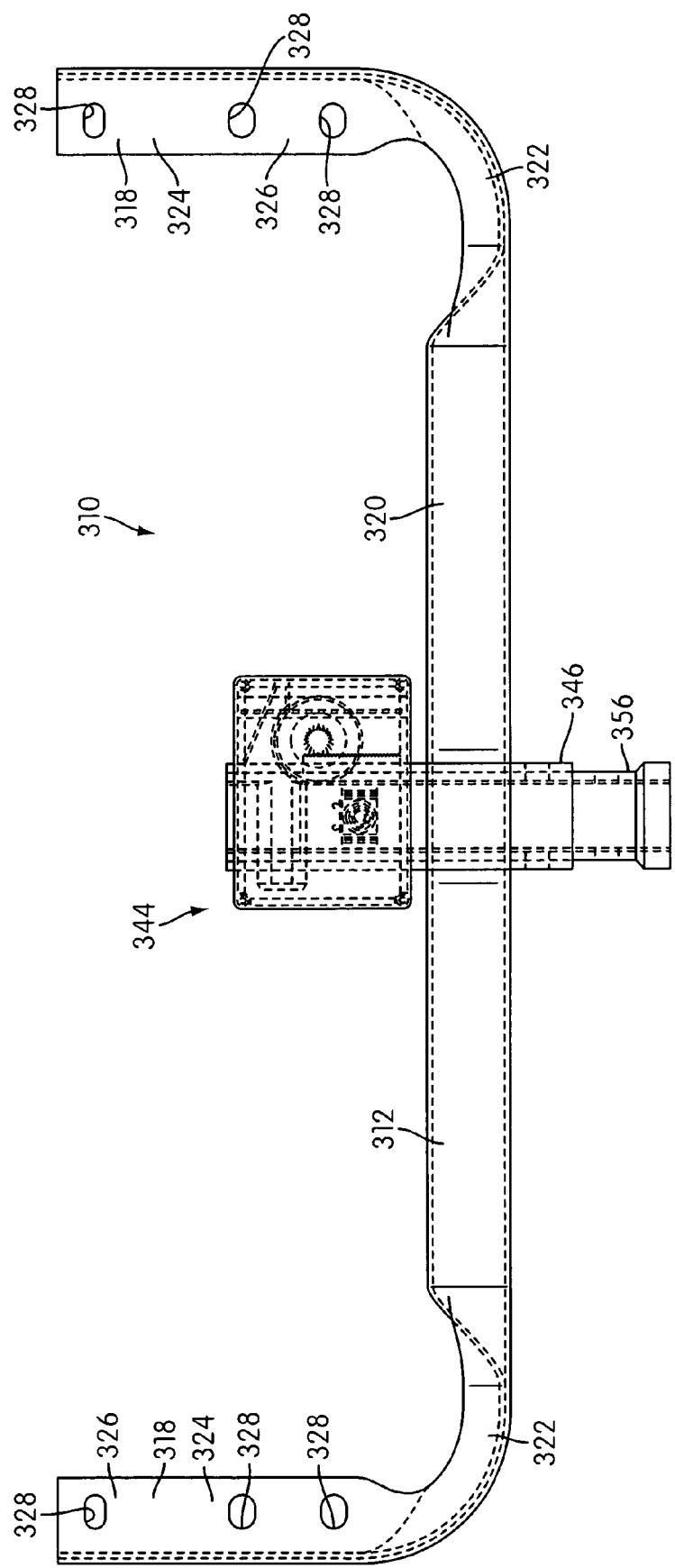
FIG. 20 is a top view of the retractable hitch assembly shown in FIG. 19.
Figure 21:
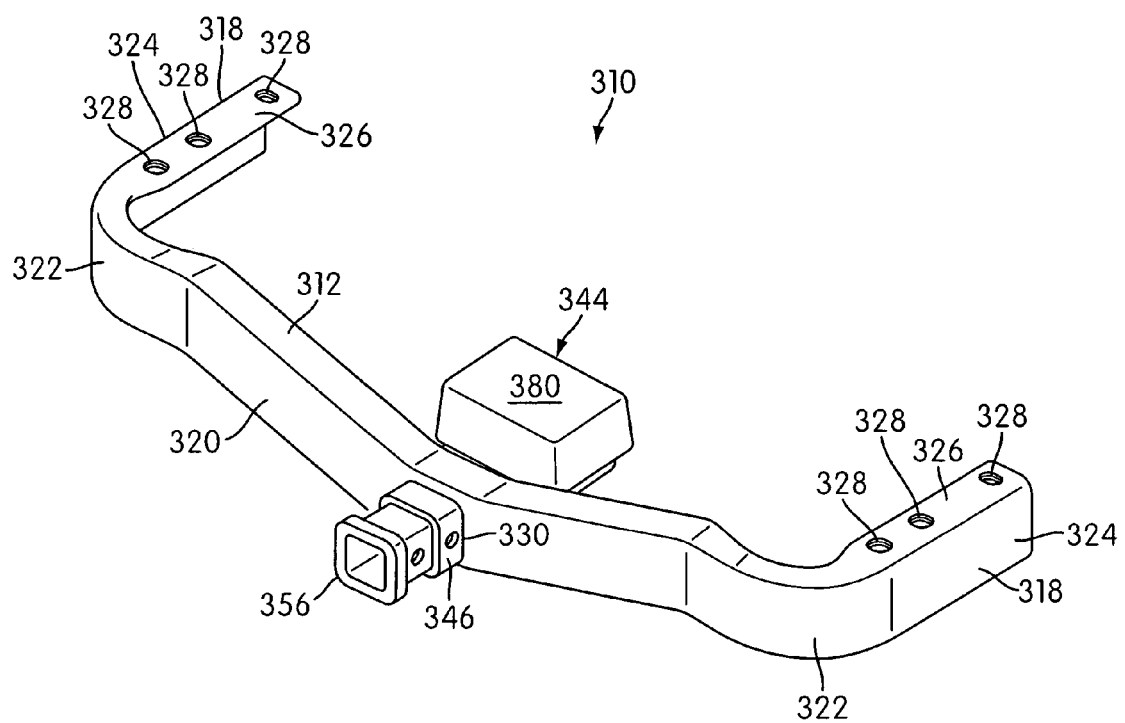
FIG. 21 is front perspective view of the retractable hitch assembly shown in FIG. 19.
Figure 22:
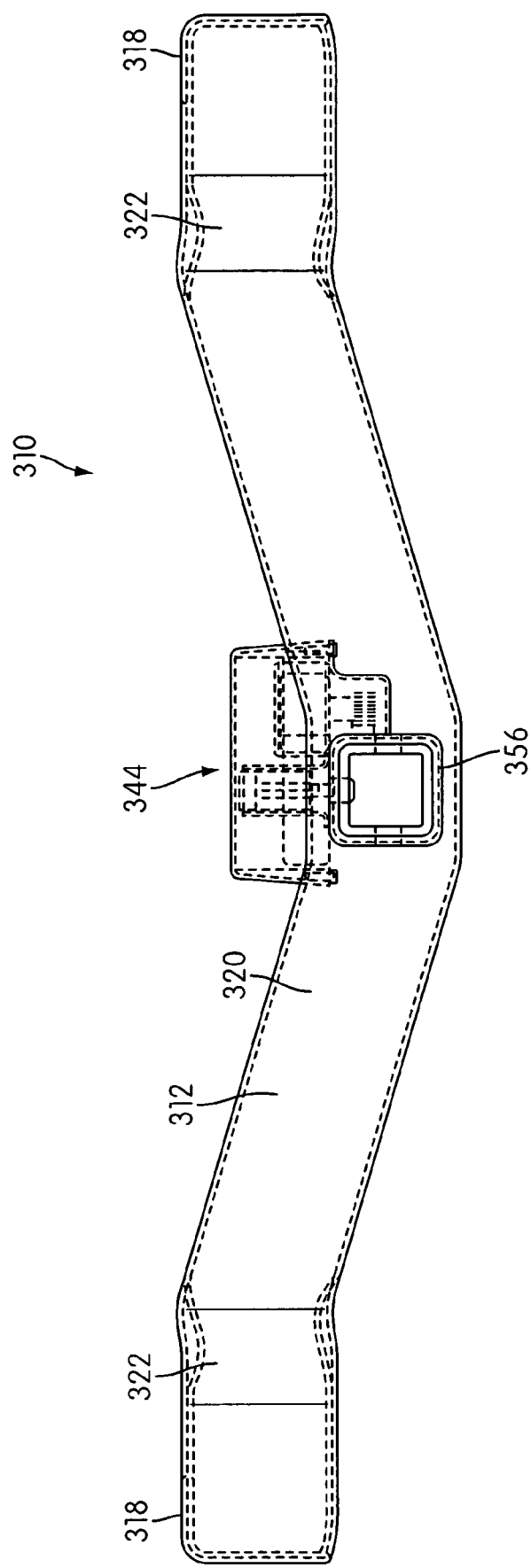
FIG. 22 is a front view of the retractable hitch assembly shown in FIG. 19.
Figure 23:
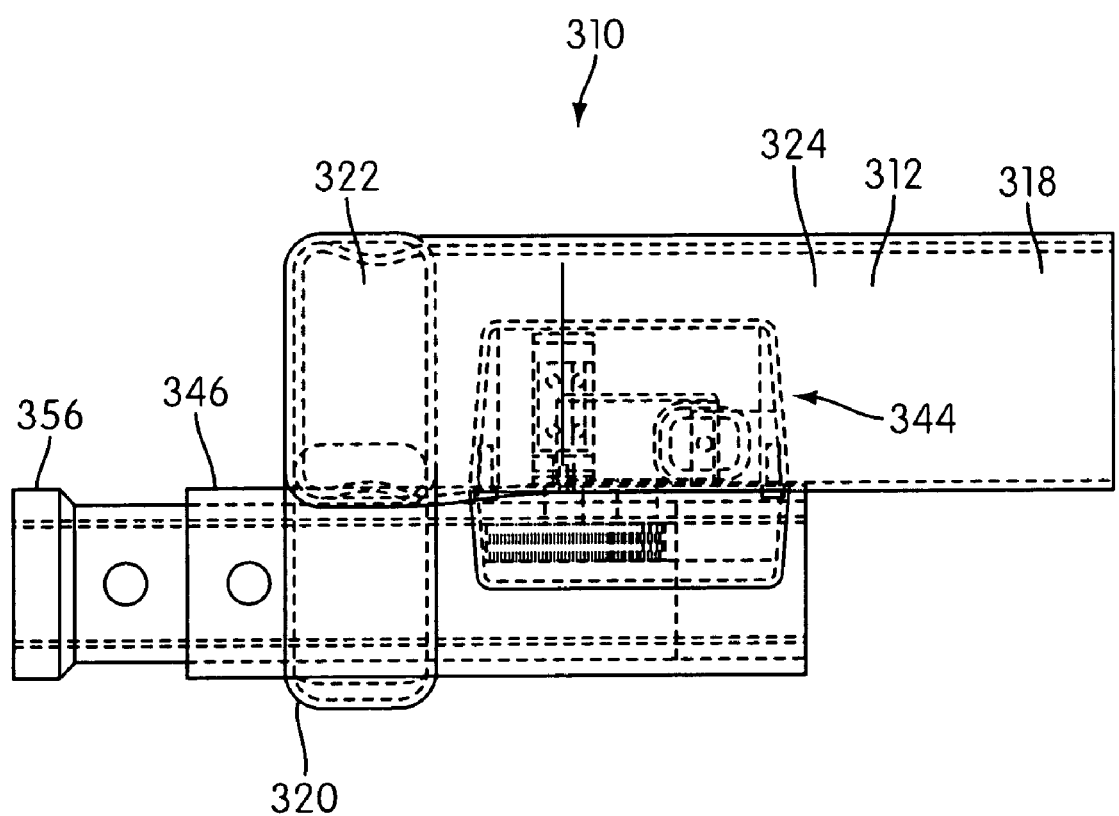
FIG. 23 is a side view of the retractable hitch assembly shown in FIG. 19.
Figure 24:
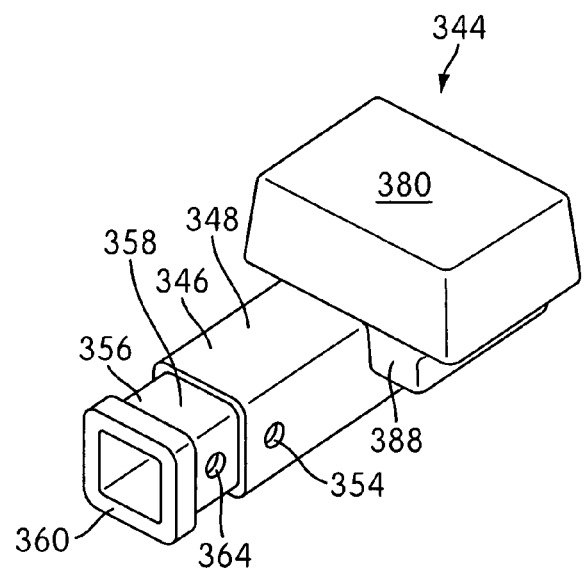
FIG. 24 is a front perspective view illustrating a retractable hitch receiver of the retractable hitch assembly shown in FIG. 19.
Figure 25:
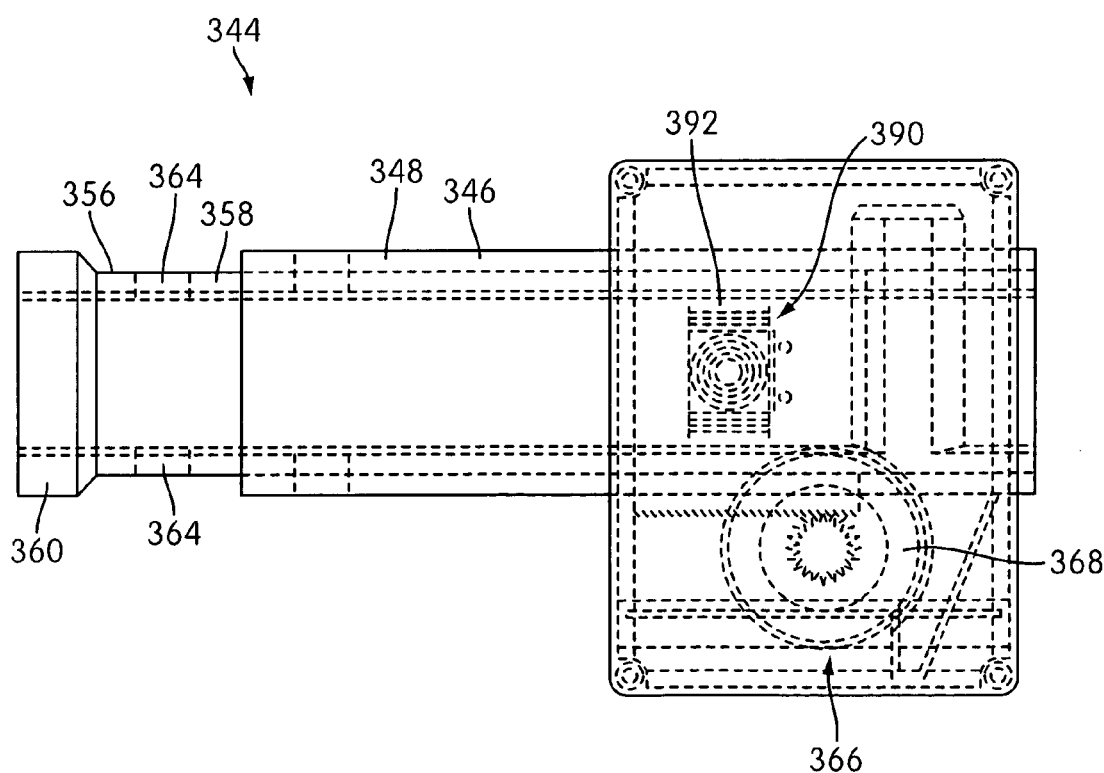
FIG. 25 is a top view of the retractable hitch receiver shown in FIG. 24 with the inner components thereof in phantom lines.
Figure 26:
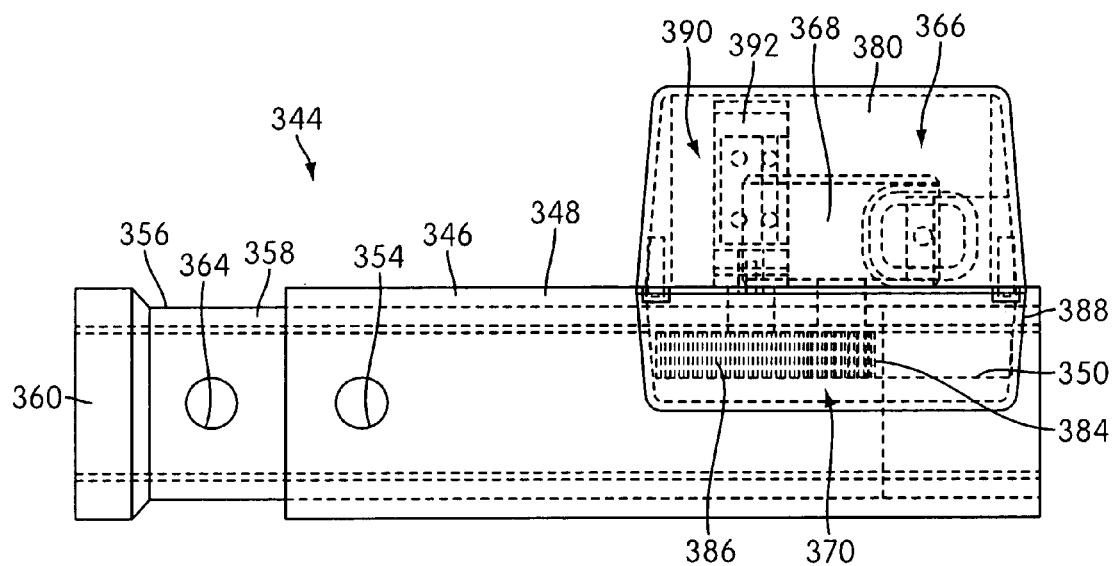
FIG. 26 is a side view of the retractable hitch receiver shown in FIG. 24 with the inner components thereof in phantom lines.
Figure 27:
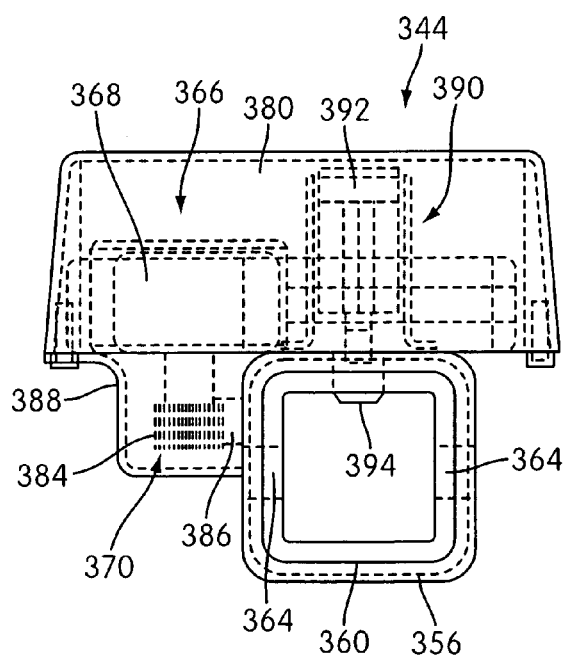
FIG. 27 is a front view of the retractable hitch receiver shown in FIG. 24 with the inner components thereof in phantom lines.
Figure 28:
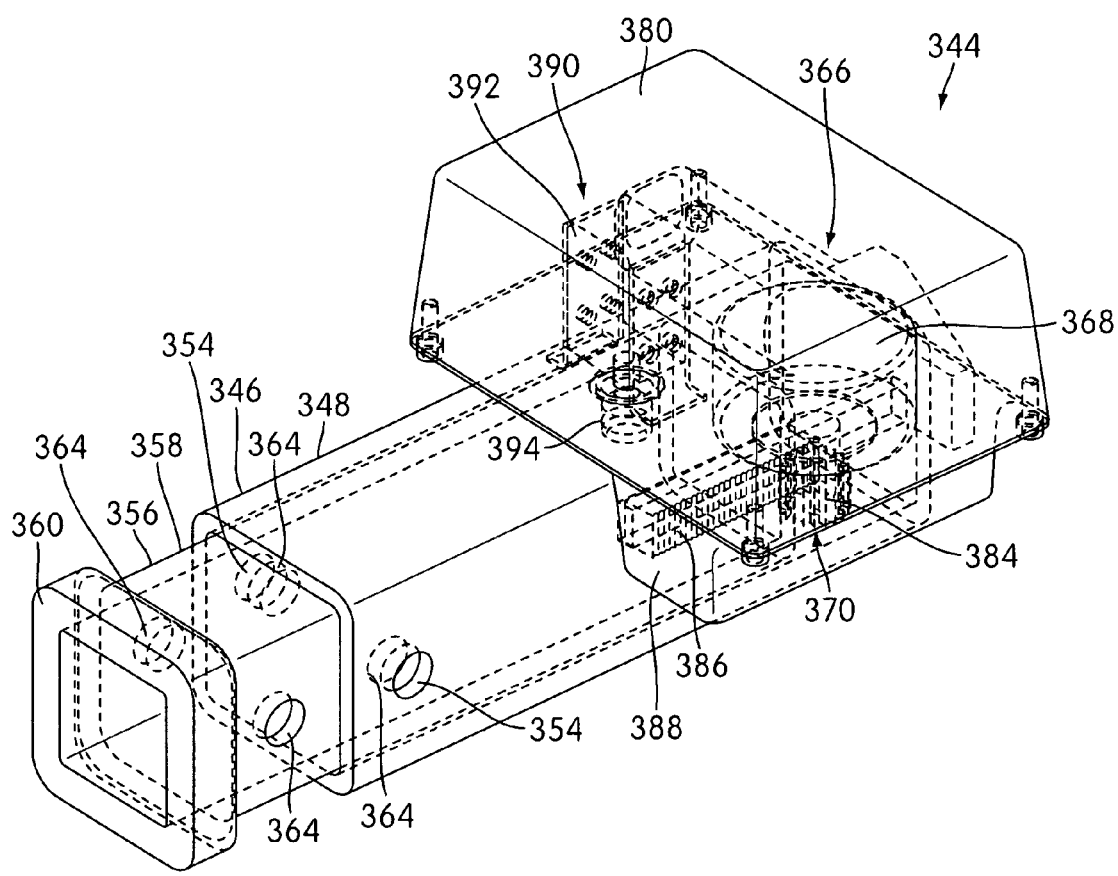
FIG. 28 is a front perspective view of the retractable hitch receiver shown in FIG. 24 with the inner components thereof in phantom lines.
Figure 29:
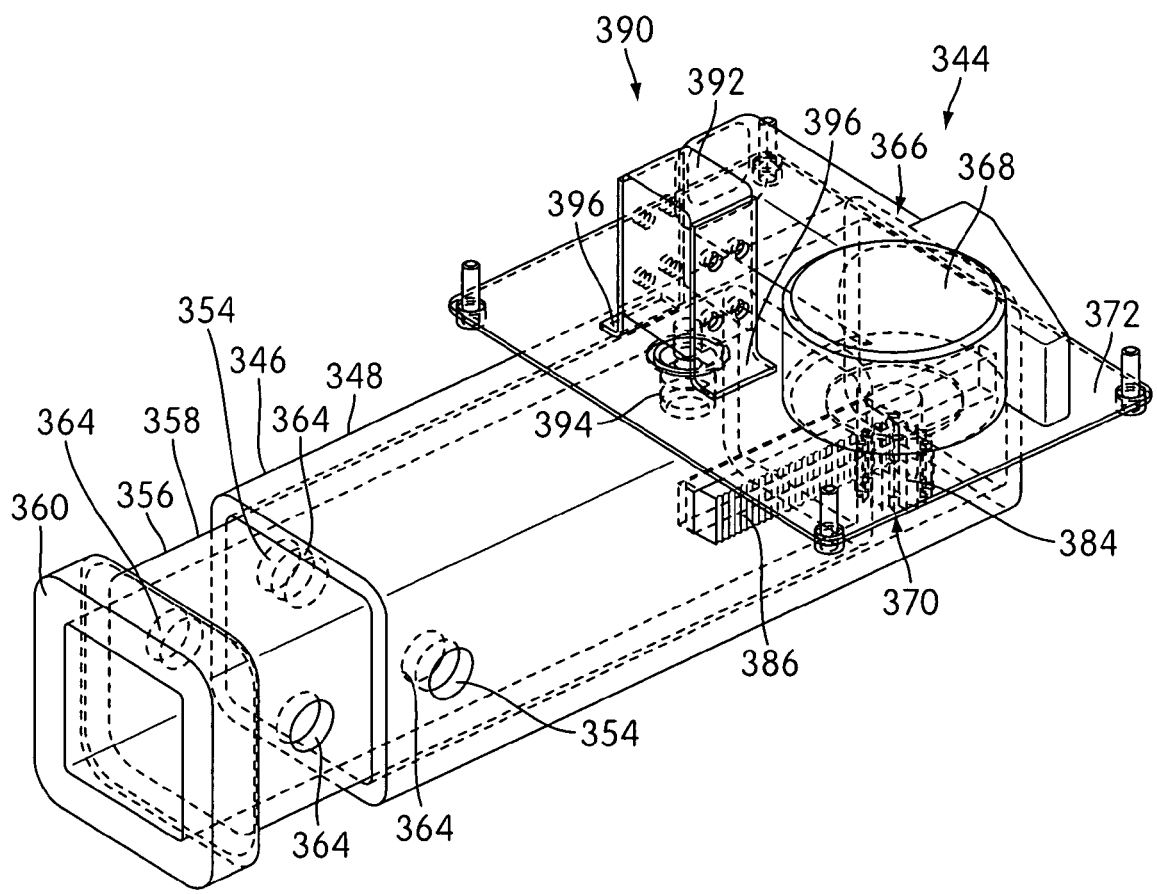
FIG. 29 is a front perspective view similar to FIG. 28 with a cover removed.
Figure 30:
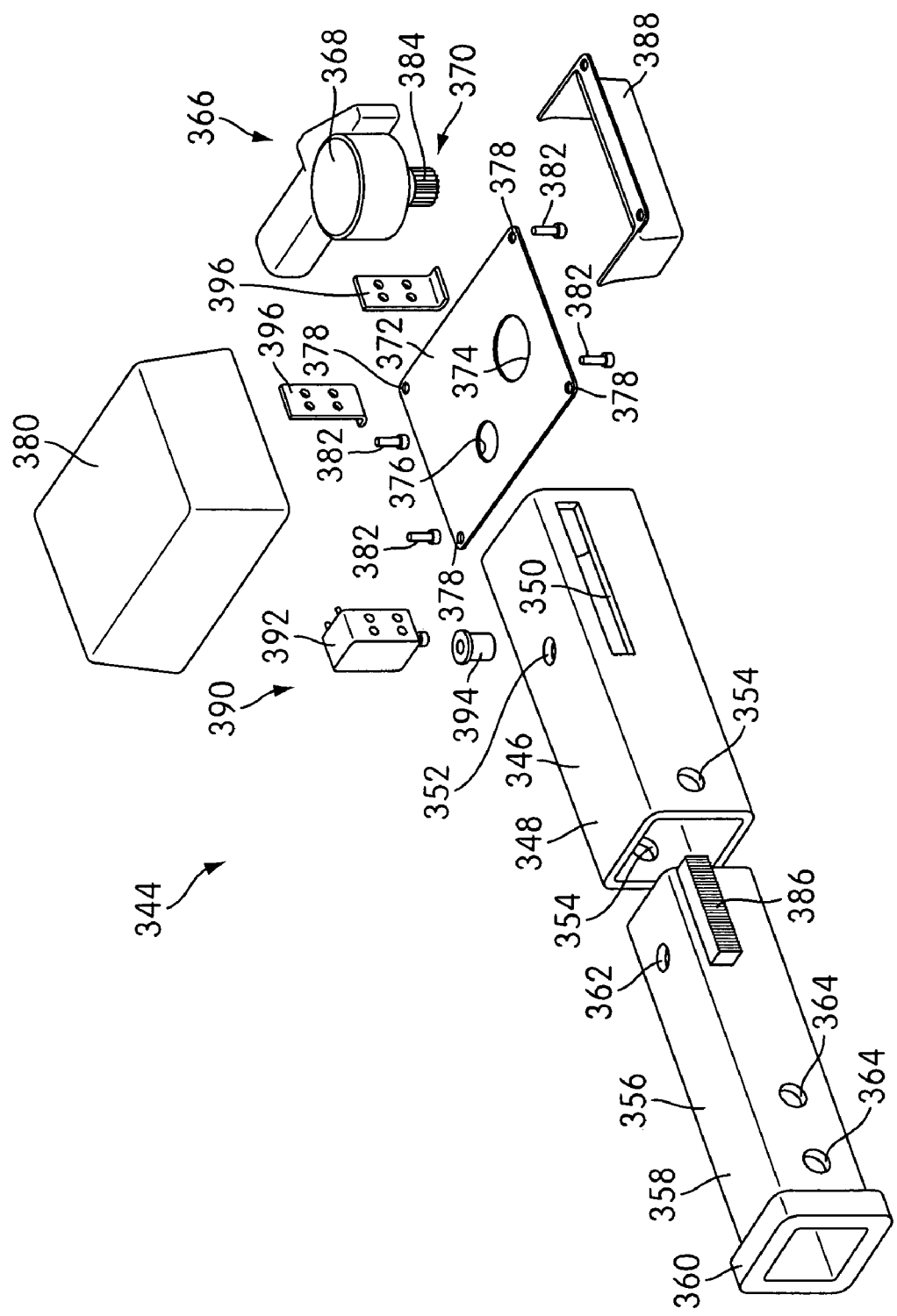
FIG. 30 is an exploded view of the retractable hitch receiver shown in FIG. 24.

Specifically, the hitch mounting structure 312 is formed from a substantially tubular body member that is bent in a die assembly into a general U-shape (when viewed from above as in FIG. 20) to provide a one-piece hitch mounting structure 312 with opposing end portions 318 and a centrally disposed intermediate portion 320 extending between the end portions 318. As shown in FIGS. 19 and 21, the intermediate portion 320 of the hitch mounting structure 312 has a generally rectangular cross-sectional configuration, while the end portions 318 each have an elbow section 322 with a general U-shaped cross-sectional configuration and a mounting section 324 with a general L-shaped cross-sectional configuration. The mounting sections 324 provide a generally horizontally extending mounting flange 326 with a plurality of openings 328, e.g., three openings, for mounting the hitch assembly 310 to the frame assembly of a vehicle. The intermediate portion 320 includes an opening 330 therethrough for mounting the retractable hitch mechanism 344.

The hitch mounting structure 312 of the retractable hitch assembly 310 may include mounting sections with a general U-shaped cross-sectional configuration, as in the hitch mounting structure 212 of hitch assembly 210 described above. The U-shaped configuration would provide generally horizontally extending mounting flanges with a plurality of openings, e.g., three openings, for mounting the hitch assembly 310 to the frame assembly of a vehicle. However, the retractable hitch mechanism 344 may be incorporated into any other suitable hitch mounting structure or frame for moving a hitch between extended and retracted positions.

As best shown in FIGS. 24–30, the retractable hitch mechanism 344 includes an outer hitch receiver 346 that is mounted within the opening 330 of the intermediate portion 320 of the hitch mounting structure 312 by welding, for example. The outer hitch receiver 346 includes a generally square-shaped body portion 348 with an elongated opening 350 in one of the side walls and a circular opening 352 in an upper wall. Also, aligned openings 354 are provided in opposing side walls of the outer hitch receiver 346. When mounted, the outer hitch receiver 346 extends thorough the intermediate portion 320 such that the elongated opening 350 is on one side of the intermediate portion 320 and the aligned openings 354 are one the other side of the intermediate portion 320 (e.g., see FIG. 23).

An inner hitch receiver 356 is telescopically mounted within the outer hitch receiver 346 for sliding movement with respect to the outer hitch receiver 346. The inner hitch receiver 356 includes a generally square-shaped body portion 358 with a receiver ring 360 provided on one end thereof. The receiver ring 360 may be formed in one piece with the boy portion 358 or may be formed separately and attached thereto. The receiver ring 360 is provided on the inner hitch receiver 356 to facilitate engagement of a hitch with the inner hitch receiver 356. The end of the inner hitch receiver 356, opposite to the receiver ring 360, is received within the outer hitch receiver 346. The inner hitch receiver 356 includes a circular opening 362 in an upper wall. Also, a pair of aligned openings 364 are provided in opposing side walls of the inner hitch receiver 356.

A selectively operable driving mechanism 366 is mounted on the outer hitch receiver 346 and operatively engaged with the inner hitch receiver 356 to selectively drive the inner hitch receiver 356 with respect to the outer hitch receiver 346 between an extended position and a storage or retracted position. In the illustrated embodiment, the driving mechanism 366 includes a reversible electric motor 368 and a rack and pinion gear arrangement 370.

Specifically, a support plate 372 is rigidly mounted to the upper wall of the outer hitch receiver 346. The support plate 372 has openings 374, 376 through an intermediate portion thereof. Also, the support plate 372 has a plurality of openings 378, e.g., four openings, along outer edges thereof for securing a cover 380 thereto by fasteners 382.

The motor 368 is suitably powered, e.g., 7–12 volts, for driving the inner hitch receiver 356 between extended and retracted positions. The rack and pinion gear arrangement 370 includes a pinion gear 384 provided on the output shaft of the motor 368 and a rack 386 provided on one of the side walls of the inner hitch receiver 356. The rack 386 on the inner hitch receiver 356 extends through the elongated opening 350 in the outer hitch receiver 346.

The motor 368 is rigidly mounted to the support plate 372 such that the pinion gear 384 extends through the opening 374 in the support plate 372 and into driving engagement with the rack 386 provided on the inner hitch receiver 356. A gear cover 388 is mounted to the support plate 372 to enclose the rack and pinion gear arrangement 370. Also, the cover 380 is mounted to the support plate 372 to enclose the motor 368.

The motor 368 may be electrically actuated, e.g., by a switch, to selectively drive the inner hitch receiver 356 with respect to the outer hitch receiver 346 via the rack and pinion gear arrangement 370. This moves the inner hitch receiver 356 between the extended and retracted positions.

In the illustrated embodiment, a locking assembly 390 is provided to lock the inner hitch receiver 356 in the extended position. The locking assembly 390 is mounted to the support plate 372 adjacent the motor 368. Specifically, the locking assembly 390 includes a solenoid 392 having a drive shaft that is movable between extended and retracted positions. A locking pin 394 is rigidly mounted to the drive shaft so as to move with the drive shaft between extended and retracted positions.

The solenoid 392 is rigidly mounted to the support plate 372, e.g., by brackets 396, such that the locking pin extends through the opening 376 in the support plate 372 and through the circular opening 352 in the upper wall of the outer hitch receiver 346. The solenoid 392 may be electrically connected to the motor 368 such that the solenoid 392 is actuated when the inner hitch receiver 356 reaches the extended position. When actuated, the solenoid 392 moves the locking pin 394 from the retracted position into the extended position. In the extended position, the locking pin 394 extends into the circular opening 362 in the upper wall of the inner hitch receiver 356 which is aligned with the circular opening 352 in the outer hitch receiver 346 when the inner hitch receiver 356 is in the extended position. This locks the inner hitch receiver 356 with respect to the outer hitch receiver 346 to prevent any relative movement. The solenoid 392 moves the locking pin 394 back into the retracted position when the motor 368 is actuated to move the inner hitch receiver 356 back into the retracted position.

In the illustrated embodiment, a safety chain mounting structure is not provided on the retractable hitch assembly 310. However, any suitable safety chain mounting structure, such as the one described above in hitch assemblies 10, 210, may be provided on the retractable hitch assembly 310.

In use, a hitch (not shown) may be slidably received within the inner hitch receiver 356 and secured thereto with a locking pin (not shown), e.g., cotter pin. Specifically, the hitch includes aligned openings in opposing side walls that are aligned with selected ones of the opposing openings 364 provided on the inner hitch receiver 356 to allow the locking pin to extend through the aligned openings to secure the hitch to the inner hitch receiver 356. The hitch may have any suitable structure, such as a ball mount or a pin mount. Also, the locking pin may extend through aligned openings 364, 354 in the outer and inner hitch receivers 346, 356 and into the openings in the hitch to secure the hitch. However, the hitch may be secured to the inner hitch receiver 356 in any other suitable manner.

When the inner hitch receiver 356 is in the extended position, the hitch thereof is disposed outwardly away from the frame assembly and the rear bumper of the vehicle. When the inner hitch receiver 356 is in the retracted position, the hitch is disposed internally of the rear bumper so it is not exposed. The retractable hitch assembly 310 allows the vehicle to be more aesthetically appealing because the hitch can be hidden from view.

It can thus be appreciated that the aspects of the present invention have been fully and effectively accomplished. The foregoing specific embodiments have been provided to illustrate the structural and functional principles of the present invention, and are not intended to be limiting. To the contrary, the present invention is intended to encompass all modifications, alterations, and substitutions within the spirit and scope of the detailed description.

What is claimed is:

1. A hitch assembly for mounting to a frame assembly of a vehicle, comprising:
   a hitch mounting structure formed from an elongated body that is bent into a general U-shape having opposing end portions and a centrally disposed intermediate portion between the end portions; and
   a hitch receiver mounted to the intermediate portion of the hitch mounting structure,
   wherein the end portions each include a mounting section with a general L-shaped cross-sectional configuration, thereby providing the end portions with horizontally extending mounting flanges structured to mount the hitch assembly to the frame assembly of the vehicle, and
   wherein the centrally disposed intermediate portion has a tubular cross-section.

2. A hitch assembly according to claim 1, wherein the hitch mounting structure is formed from a substantially tubular body member having a generally rectangular cross-section.

3. A hitch assembly according to claim 1, wherein the intermediate portion of the hitch mounting structure has a generally rectangular cross-sectional configuration.

4. A hitch assembly according to claim 1, wherein the end portions include an elbow section with a general U-shaped cross-sectional configuration.

5. The hitch assembly according to claim 4, wherein the elbow sections extend from the respective end portions to the centrally disposed intermediate portion.

6. The hitch assembly of claim 4, wherein bent portions of the elongated body define the elbow sections.

7. The hitch assembly of claim 4, wherein:
   the elongated body comprises a substantially tubular body member, and
   the elbow sections each comprise a portion of the substantially tubular body member that is bent into the general U-shaped cross-sectional configuration.

8. A hitch assembly according to claim 1, wherein each of the horizontally extending mounting flanges include a plurality of openings for mounting the hitch assembly to the frame assembly of the vehicle.

9. A hitch assembly according to claim 1, wherein the intermediate portion of the hitch mounting structure includes an opening structured to mount the hitch receiver.

10. A hitch assembly according to claim 9, wherein the intermediate portion has a general V-shape such that the end portions are positioned higher than the opening in the intermediate portion.

11. The hitch assembly of claim 1, wherein:
the elongated body comprises an elongated substantially tubular body member, and
the mounting sections each comprise a portion of the elongated substantially tubular body member that is bent into the general L-shaped cross-sectional configuration.

12. A retractable hitch assembly for mounting to a frame assembly of a vehicle, comprising:
a hitch mounting structure with end portions and a centrally disposed intermediate portion between the end portions, the end portions each including an elbow section with a general U-shaped cross-sectional configuration, the end portions structured to rigidly mount the retractable hitch assembly to the frame assembly of the vehicle; and
a retractable hitch mechanism rigidly mounted to the hitch mounting structure, the retractable hitch mechanism including:
an outer hitch receiver mounted to the intermediate portion of the hitch mounting structure;
an inner hitch receiver telescopically mounted within the outer hitch receiver for sliding movement with respect to the outer hitch receiver between an extended position and a retracted position;
a reversible electric motor; and
a gear arrangement operatively mounted between the reversible electric motor and the inner hitch receiver,
wherein the reversible electric motor is electrically actuated to selectively drive the inner hitch receiver with respect to the outer hitch receiver via the gear arrangement between the extended and retracted positions thereof.

13. A retractable hitch assembly according to claim 12, wherein the hitch mounting structure is formed from an elongated body that is bent into a structure having a general U-shape.

14. A retractable hitch assembly according to claim 13, wherein the end portions each include a mounting section with a general L-shaped cross-sectional configuration, thereby providing the end portions with horizontally extending mounting flanges structured to mount the hitch assembly to the frame assembly of the vehicle.

15. A retractable hitch assembly according to claim 13, wherein the hitch mounting structure is formed from a substantially tubular body member having a generally rectangular cross-section.

16. A retractable hitch assembly according to claim 13, wherein the intermediate portion of the hitch mounting structure has a generally rectangular cross-sectional configuration.

17. The hitch assembly according to claim 13, wherein the elbow sections extend from the respective end portions to the centrally disposed intermediate portion.

18. A retractable hitch assembly according to claim 12, wherein the intermediate portion of the hitch mounting structure includes an opening structured to mount the outer hitch receiver.

19. A retractable hitch assembly according to claim 18, wherein the intermediate portion has a general V-shape such that the end portions are positioned higher than the opening in the intermediate portion.

20. A retractable hitch assembly according to claim 12, wherein the inner hitch receiver include a receiver ring on one end thereof.

21. A retractable hitch assembly according to claim 12, wherein the gear arrangement is a rack and pinion gear arrangement, the rack and pinion gear arrangement including a pinion gear provided on an output shaft of the reversible electric motor and a rack provided on a side wall of the inner hitch receiver.

22. A retractable hitch assembly according to claim 12, further comprising a locking assembly to lock the inner hitch receiver in the extended position thereof.

23. A retractable hitch assembly for mounting to a frame assembly of a vehicle, comprising:
a hitch mounting structure with end portions and a centrally disposed intermediate portion between the end portions, the end portions structured to mount the retractable hitch assembly to the frame assembly of the vehicle;
a retractable hitch mechanism securely mounted to the hitch mounting structure, the retractable hitch mechanism including:
an outer hitch receiver mounted to the intermediate portion of the hitch mounting structure;
an inner hitch receiver telescopically mounted within the outer hitch receiver for sliding movement with respect to the outer hitch receiver between an extended position and a retracted position;
a reversible electric motor; and
a gear arrangement operatively mounted between the reversible electric motor and the inner hitch receiver,
wherein the reversible electric motor is electrically actuated to selectively drive the inner hitch receiver with respect to the outer hitch receiver via the gear arrangement between the extended and retracted positions thereof; and
a locking assembly to lock the inner hitch receiver in the extended position thereof, wherein the locking assembly includes a solenoid having a drive shaft that is movable between extended and retracted positions and a locking pin rigidly mounted to the drive shaft so as to move with the drive shaft between extended and retracted positions, the solenoid being electrically connected to the reversible electric motor such that the solenoid is actuated when the inner hitch receiver reaches the extended position so as to move the locking pin from the retracted position into the extended position wherein the locking pin operatively engages the inner hitch receiver to lock the inner hitch receiver with respect to the outer hitch receiver.

24. A hitch assembly for mounting to a frame assembly of a vehicle, comprising:
a hitch mounting structure formed from an elongated substantially tubular body that is bent into a general U-shape having opposing end portions and a centrally disposed intermediate portion between the end portions, the end portions each including an elbow section with a general U-shaped cross-sectional configuration; and a hitch receiver mounted to the intermediate portion of the hitch mounting structure, wherein the end portions each include a mounting section with a horizontally extending mounting flange structured to mount the hitch assembly to the frame assembly of the vehicle.

25. The hitch assembly of claim 24, wherein each mounting section includes a general L-shaped cross-sectional configuration, wherein the L-shaped cross-sectional configuration provides the horizontally extending mounting flange.

26. The hitch assembly of claim 25, wherein the mounting sections each comprise a portion of the elongated substantially tubular body that is bent into the general L-shaped cross-sectional configuration.

27. A hitch assembly according to claim 24, wherein bent portions of the elongated substantially tubular body define the elbow sections.

28. A hitch assembly according to claim 24, wherein the intermediate portion has a tubular cross-section.

* * * * *